(12) United States Patent
Itagaki et al.

(10) Patent No.: US 10,257,858 B2
(45) Date of Patent: Apr. 9, 2019

(54) ELECTRONIC DEVICE AND METHOD

(71) Applicant: SONY CORPORATION, Tokyo (JP)

(72) Inventors: Takeshi Itagaki, Saitama (JP); Tomoya Yamaura, Tokyo (JP); Kazuyuki Sakoda, Chiba (JP)

(73) Assignee: SONY CORPORATION, Tokyo (JP)

( * ) Notice: Subject to any disclaimer, the term of this patent is extended or adjusted under 35 U.S.C. 154(b) by 179 days.

(21) Appl. No.: 15/304,672

(22) PCT Filed: May 1, 2015

(86) PCT No.: PCT/JP2015/002314
§ 371 (c)(1),
(2) Date: Oct. 17, 2016

(87) PCT Pub. No.: WO2015/182044
PCT Pub. Date: Dec. 3, 2015

(65) Prior Publication Data
US 2017/0041959 A1   Feb. 9, 2017

(30) Foreign Application Priority Data

May 26, 2014 (JP) ................................. 2014-107764

(51) Int. Cl.
*H04W 74/08* (2009.01)
*H04W 24/08* (2009.01)

(52) U.S. Cl.
CPC ....... *H04W 74/0816* (2013.01); *H04W 24/08* (2013.01)

(58) Field of Classification Search
CPC ............. H04W 74/08; H04W 74/0808; H04W 74/0816
See application file for complete search history.

(56) References Cited

U.S. PATENT DOCUMENTS

| 9,807,699 B2* | 10/2017 | Oteri ................... H04W 52/243 |
| 2005/0129051 A1* | 6/2005 | Zhu ........................ H04W 28/18 370/445 |
| 2006/0221999 A1* | 10/2006 | Bachrach .......... H04W 74/0816 370/465 |
| 2006/0264229 A1* | 11/2006 | Guo ....................... H04W 52/34 455/522 |

(Continued)

FOREIGN PATENT DOCUMENTS

| JP | 2007-67472 A | 3/2007 |
| JP | 2007-142722 A | 6/2007 |
| JP | 2007-168373 A | 8/2007 |

OTHER PUBLICATIONS

Office Action dated Oct. 16, 2017 in Japanese Patent Application No. 2014-107764, 4 pages.

(Continued)

*Primary Examiner* — Scott M Sciacca
(74) *Attorney, Agent, or Firm* — Xsensus, LLP

(57) ABSTRACT

An electronic device that controls changing a carrier sense detection threshold or disabling transmission suppression based on a communication quality of at least one of a first frame of which an intended destination is not the electronic device and a second frame transmitted in response to the first frame in a case that the transmission suppression is initially set.

20 Claims, 30 Drawing Sheets

(56) References Cited

U.S. PATENT DOCUMENTS

| | | | |
|---|---|---|---|
| 2007/0242621 A1* | 10/2007 | Nandagopalan | H04L 12/413 370/254 |
| 2008/0144493 A1* | 6/2008 | Yeh | H04W 52/50 370/230 |
| 2012/0099450 A1 | 4/2012 | Madan et al. | |
| 2013/0058218 A1 | 3/2013 | Wu et al. | |
| 2016/0081010 A1* | 3/2016 | Seok | H04W 74/0816 370/329 |
| 2017/0134975 A1* | 5/2017 | Huang | H04W 24/08 |

OTHER PUBLICATIONS

Simone Merlin, et al., "Methods for improving medium reuse in IEEE 802.11 networks," Consumer Communications and Networking Conference, 2009, CCNC 2009, 6$^{th}$ IEEE, XP031425408, Jan. 10, 2009, pp. 1-5.

Hiroaki Morino, et al., "Distance-and-Rate Dependent RTS/CTS Reservation in Wireless LAN for Enhancing Spatial Reuse," 2011 Tenth International Symposium on Autonomous Decentralized Systems (ISADS), IEEE, XP031936963, Mar. 23, 2011, pp. 489-494.

International Search Report dated Aug. 13, 2015 in PCT/JP2015/002314 filed May 1, 2015.

Office Action dated Mar. 6, 2018 in corresponding European Patent Application No. 15 726 742.8.

\* cited by examiner

FIG. 3

| Peer MAC Address | Link Quality |
|---|---|
| 00:11:22:33:44:55 | −62dBm |
| 00:66:77:88:99:AA | −75dBm |
| 00:BB:CC:DD:EE:FF | −58dBm |

201 — Peer MAC Address
202 — Link Quality

FIG. 5

| MAC Address1 | MAC Address2 | Link Quality |
|---|---|---|
| 00:12:34:56:78:9A | 00:11:22:33:44:55 | −62dBm |
| 00:12:34:56:78:9A | 00:66:77:88:99:AA | −75dBm |
| 00:12:34:56:78:9A | 00:BB:CC:DD:EE:FF | −58dBm |
| 00:BC:DE:F0:12:34 | 00:44:44:44:44:44 | −71dBm |

221  222  223

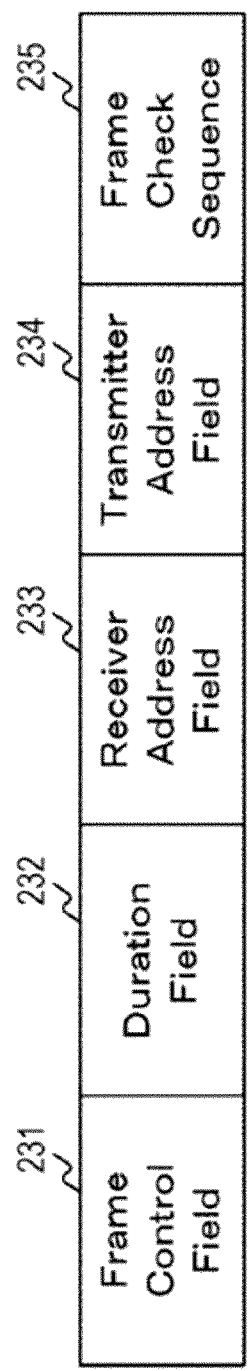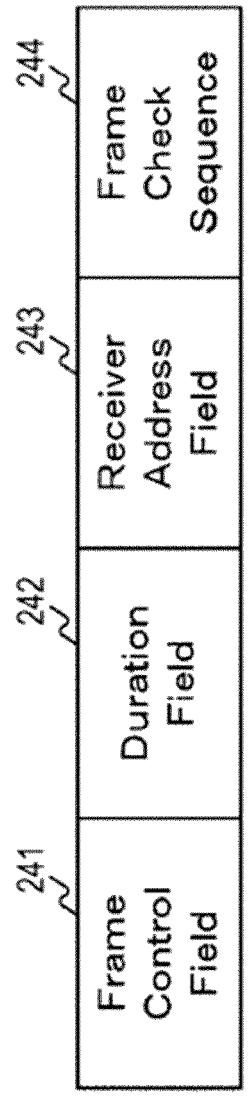
FIG. 6A
FIG. 6B

ELECTRONIC DEVICE AND METHOD

TECHNICAL FIELD

The present technology relates to an information processing apparatus. Specifically, the present technology relates to an information processing apparatus and an information processing method for exchanging information using wireless communication.

BACKGROUND ART

Hitherto, there is a wireless communication technique for exchanging information using wireless communication. For example, a communication method (for example, an autonomous and decentralized wireless network) of autonomously connecting to neighboring information processing apparatuses is proposed. By using this communication method, information can be exchanged between two information processing apparatuses using wireless communication even when the information processing apparatuses are not connected by cable lines.

Moreover, a method called carrier sense is known as an arbitration method for avoiding a packet collision during communication between information processing apparatuses, and for example, is employed in an autonomous and decentralized wireless network.

For example, a wireless communication device that sets a carrier sense threshold level dynamically based on a desired wave power to suppress transmission is proposed (for example, see PTL 1).

CITATION LIST

Patent Literature

PTL 1: JP 2007-142722A

SUMMARY

Technical Problem

In the technique of the related art, even when a reception signal strength is equal to or smaller than the carrier sense threshold level and signals can be transmitted, if the ratio of desired wave power to interference signal power can cause a transmission error, transmission may be suppressed.

However, if the number of information processing apparatuses that form a network increases, transmission suppression may occur excessively and transmission efficiency of an overall system may decrease. Thus, it is important to maintain communication quality to use wireless resources efficiently.

The present technology has been made in view of the problems, and aims to use wireless resources efficiently.

Solution to Problem

The present technology has been made to solve the above problems, and a first aspect thereof provides an apparatus that controls changing a carrier sense detection threshold or disabling transmission suppression based on a communication quality of at least one of a first frame of which an intended destination is not the electronic device and a second frame transmitted in response to the first frame in a case that the transmission suppression is initially set.

Advantageous Effects of Invention

According to an embodiment of the present technology, it is possible to provide an excellent advantage that wireless resources can be used efficiently. The present technology is not necessarily limited to the advantage mentioned herein but any of the advantages described in the present disclosure may be provided.

BRIEF DESCRIPTION OF DRAWINGS

FIG. 3 is a diagram illustrating a format example of link quality information stored in a memory 160 according to the first embodiment of the present technology.

FIG. 5 is a diagram illustrating a format example of a link quality information management list stored in the memory 160 according to the first embodiment of the present technology.

FIGS. 6A and 6B are diagrams illustrating a format example of RTS/CTS frames exchanged between respective information processing apparatuses that form the communication system 10 according to the first embodiment of the present technology.

DESCRIPTION OF EMBODIMENTS

Hereinafter, modes (hereinafter referred to as embodiments) for carrying out the present technology will be described. The description will be given in the following order:

1. First Embodiment (Clearing of transmission suppression and changing of carrier sense detection threshold using link quality information notified from another information processing apparatus);
2. Second Embodiment (Clearing of transmission suppression and changing of carrier sense detection threshold using link quality information included in RTS/CTS frame);
3. Third Embodiment (Changing transmission suppression clearing condition to clear transmission suppression and change carrier sense detection threshold);
4. Fourth Embodiment (Replacing RTS/CTS in first embodiment with Data/Ack);
5. Fifth Embodiment (Replacing RTS/CTS in second embodiment with Data/Ack);
6. Sixth Embodiment (Replacing RTS/CTS in third embodiment with Data/Ack); and
7. Application Example.

1. First Embodiment

Configuration Example of Communication System

Figure 1:
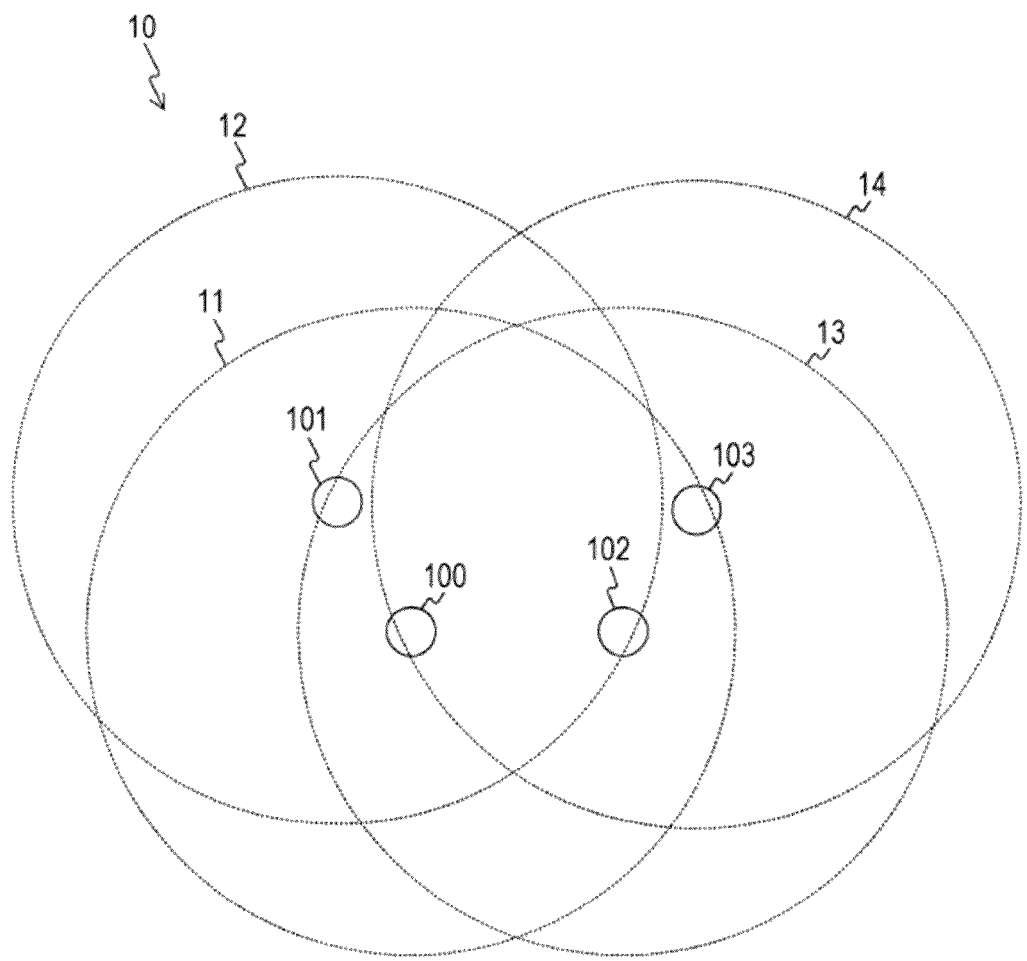
FIG. 1 is a diagram illustrating a system configuration example of a communication system 10 according to a first embodiment of the present technology.

FIG. 1 is a diagram illustrating a system configuration example of a communication system 10 according to a first embodiment of the present technology.

The communication system 10 includes a plurality of information processing apparatuses 100 to 103. The information processing apparatuses 100 to 103 are portable information processing apparatuses having a wireless communication function, for example. Here, the portable information processing apparatus is an information processing apparatus such as, for example, a smartphone, a mobile phone, or a tablet terminal. Moreover, the information processing apparatuses 100 to 103 can perform wireless communication according to a wireless local area network (LAN) communication scheme, for example. Wi-Fi (wireless fidelity), Wi-Fi Direct, and Wi-Fi CERTIFIED Miracast specifications (technical specification name: Wi-Fi Display) can be used as the wireless LAN, for example. Moreover, wireless communication which uses another communication scheme may be performed.

In the first embodiment of the present technology, an example of communications between respective apparatuses when the information processing apparatus 100 and the information processing apparatus 101 are connected and the information processing apparatus 102 and the information processing apparatus 103 are connected is illustrated.

Although FIG. 1 illustrates an example in which four information processing apparatuses 100 to 103 form the communication system 10, the number of information processing apparatuses is not limited to 4. That is, the embodiment of the present technology can be applied to a communication system formed by three or five or more information processing apparatuses.

Moreover, two information processing apparatuses that perform communication may be the relation of a parent station and a child station. Moreover, a connection between two information processing apparatuses may be a connection of direct communication between child stations.

In FIG. 1, physical carrier sense detection ranges 11 to 14 of the information processing apparatuses 100 to 103 are schematically illustrated by dotted circles. Specifically, the physical carrier sense detection range 11 indicates the physical carrier sense detection range of the information processing apparatus 100, and the physical carrier sense detection range 12 indicates the physical carrier sense detection range of the information processing apparatus 101. Moreover, the physical carrier sense detection range 13 indicates the physical carrier sense detection range of the information processing apparatus 102, and the physical carrier sense detection range 14 indicates the physical carrier sense detection range of the information processing apparatus 103.

Physical carrier sense is an example of an arbitration mechanism (carrier sense) for avoiding a packet collision and this mechanism performs transmission suppression in accordance with the presence of another information processing apparatus that performs transmission. Moreover, the physical carrier sense detection range is a threshold used when detecting the presence of another information processing apparatus that performs transmission.

Configuration Example of Information Processing Apparatus

Figure 2:
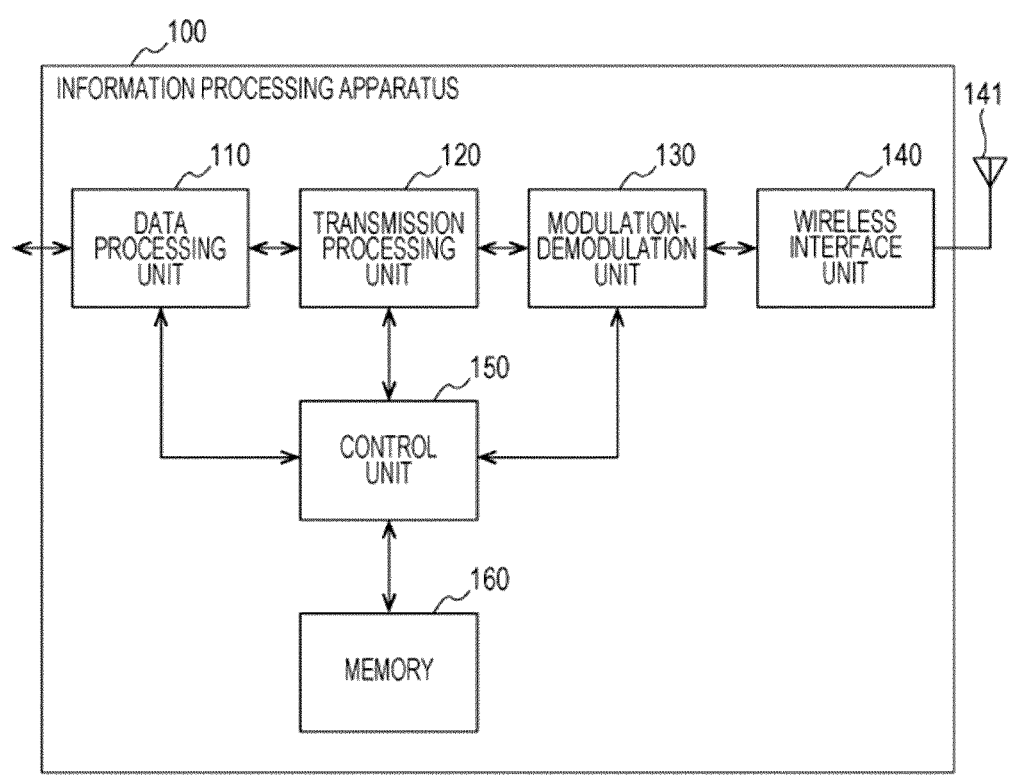
FIG. 2 is a block diagram illustrating a functional configuration example of an information processing apparatus 100 according to the first embodiment of the present technology.

FIG. 2 is a block diagram illustrating a functional configuration example of the information processing apparatus 100 according to the first embodiment of the present technology. Since the function configuration (a function configuration related to wireless communication) of the information processing apparatus 101, the information processing apparatus 102, and the information processing apparatus 103 is approximately the same as that of the information processing apparatus 100, description thereof will not be provided here.

The information processing apparatus 100 includes a data processing unit 110, a transmission processing unit 120, a modulation-demodulation unit 130, a wireless interface unit 140, an antenna 141, a control unit 150, and a memory 160.

The data processing unit 110 processes various types of data based on control of the control unit 150. For example, the data processing unit 110 creates the body such as various data frames and data packets, and the like. For example, when performing a transmission operation, the data processing unit 110 creates various data frames and data packets in accordance with a request from an upper layer and supplies the same to the transmission processing unit 120. Moreover, for example, when performing a receiving operation, the data processing unit 110 processes and analyzes various data frames and data packets supplied from the transmission processing unit 120.

The transmission processing unit 120 performs various transmission processes based on control of the control unit 150. For example, when performing a transmission operation, the transmission processing unit 120 performs processes such as adding a header for media access control or adding error detection codes with respect to the packets generated by the data processing unit 110. For example, the transmission processing unit 120 performs processes such as adding a MAC header for media access control addresses (MAC) or adding error detection codes with respect to the packets generated by the data processing unit 110. The transmission processing unit 120 supplies the processed data to the modulation-demodulation unit 130.

Moreover, when virtual carrier sense is used, the transmission processing unit 120 calculates a network allocation vector (NAV) to be added. Here, virtual carrier sense is an example of an arbitration mechanism (carrier sense) for avoiding a packet collision and this mechanism describes a transmission suppression period in the content of a wireless packet and sets transmission suppression to an information processing apparatus having received the packet. Moreover, NAV means a time period of the transmission suppression.

Moreover, for example, when performing a receiving operation, the transmission processing unit 120 performs processes (for example, packet error detection, MAC header analysis and removal) opposite to those during the transmission operation with respect to bitstream supplied from the modulation-demodulation unit 130. Upon checking that the data frame does not have an error based on an error detection code, the transmission processing unit 120 supplies various data frames to the data processing unit 110.

The transmission processing unit 120 performs a virtual carrier sensing process. In this case, when a NAV is set to the header of a received packet and transmission suppression is set, the transmission processing unit 120 notifies the control unit 150 of the fact thereof.

The modulation-demodulation unit 130 performs a modulation-demodulation process based on control of the control unit 150. For example, when performing a transmission operation, the modulation-demodulation unit 130 performs encoding, interleaving, modulation, and adding of preamble signals with respect to a bitstream input from the transmission processing unit 120 based on coding and modulation schemes set by the control unit 150. The modulation-demodulation unit 130 generates data symbol streams and supplies the same to the wireless interface unit 140.

Moreover, for example, when performing a receiving operation, the modulation-demodulation unit 130 performs processes opposite to those during the transmission operation with respect to the input from the wireless interface unit 140 and supplies the processing results to the transmission processing unit 120. Moreover, the modulation-demodulation unit 130 performs a physical carrier sensing process. In this case, when a reception power equal to or larger than a threshold is detected, the modulation-demodulation unit 130 determines that wireless connection is busy and notifies the control unit 150 of the fact thereof.

The wireless interface unit 140 is an interface for connecting to other information processing apparatuses to transmit and receive various items of information. For example, when performing a transmission operation, the wireless interface unit 140 converts a signal input from the modulation-demodulation unit 130 into an analog signal, amplifies the analog signal, performs filtering and frequency upconversion, and transmits the processed signal from the antenna 141 as a wireless signal. Moreover, for example, when performing a receiving operation, the wireless interface unit 140 performs processes opposite to those during the transmission operation with respect to the input from the antenna 141 and supplies the processing results to the modulation-demodulation unit 130.

The control unit 150 controls the receiving operation and the transmission operation of the data processing unit 110, the transmission processing unit 120, the modulation-demodulation unit 130, and the wireless interface unit 140. For example, the control unit 150 exchanges information between respective units, sets communication parameters, and performs scheduling of packet in the transmission processing unit 120. Moreover, upon receiving the notification of carrier sensing results from the modulation-demodulation unit 130 and the transmission processing unit 120, the control unit 150 performs processes related to setting and clearing of transmission suppression based on the notification.

Here, a case where transmission suppression is set to the information processing apparatus 100 in accordance with reception of at least one of a first frame of which the destination is not the information processing apparatus 100 and a second frame that is transmitted in response to the first frame will be considered. In this case, the control unit 150 performs control of clearing the transmission suppression based on a communication quality during reception of at least one of the first and second frames. Here, in the first to third embodiments of the present technology, an example in which the first frame is a request-to-send (RTS) frame and the second frame is a clear-to-send (CTS) frame is illustrated. Moreover, in the fourth to sixth embodiments of the present technology, an example in which the first frame is a DATA frame and the second frame is an ACK frame is illustrated. Moreover, the communication quality of the first and second frames may be reception strength of respective frames, for example.

The memory 160 performs the role of a work area for data processing of the control unit 150 and the function of a storage medium that stores various types of data. Storage media such as a nonvolatile memory, a magnetic disk, an optical disc, or a magneto-optical (MO) disc, for example, can be used as the memory 160. An electrically erasable programmable read-only memory (EEPROM) or an erasable programmable ROM (EPROM), for example, can be used as the nonvolatile memory. Moreover, a hard disc or a disc-shaped magnetic disk, for example, can be used as the magnetic disk. Moreover, a compact disc (CD), a digital versatile disc recordable (DVD-R), or a Blu-ray disc (BD) (registered trademark), for example, can be used as the optical disc.

Notification Example of Link Quality Information

Here, a notification example of link quality information will be described.

The information processing apparatuses 100 to 102 broadcast information (link quality information) on a communication quality with an information processing apparatus connected to the subject apparatus periodically or non-periodically (for example, every predetermined trigger) independently of data transmission. For example, the point in time at which the content related to a communication time is changed may be used as the predetermined trigger.

The format of a content notified in this manner is constructed such that identification information (for example, MAC address) for identifying a connection destination information processing apparatus and information on communication quality form a pair and these items of information are arranged in a list form.

Here, communication quality is respective items of information (for example, reception strength or a signal-to-noise ratio (SNR)) during reception of packets received in the past from a connection destination information processing apparatus, for example. Moreover, for example, communication quality acquired by a connection destination information processing apparatus may be notified in advance and the communication quality may be used. Further, when information on transmission power of a subject apparatus or a connection destination information processing apparatus is known, the information may be added to the communication quality.

An average or a weighted average within a predetermined range of a plurality of transmission and reception results may be used as the communication quality. Moreover, information (for example, communication quality on an information processing apparatus which has not transmitted or received data for a long period) which is not reliable as communication quality may be deleted from registration. Further, a counterpart information processing apparatus of which the communication quality is equal to or smaller than a reference value may be deleted from registration.

In the first embodiment of the present technology, an example in which the reception strength during reception of packets received in the past from a connection destination information processing apparatus is used as communication quality is illustrated. This example is illustrated in FIG. 3.

Format Example of Link Quality Information

FIG. 3 is a diagram illustrating a format example of link quality information stored in the memory 160 according to the first embodiment of the present technology.

The link quality information is information recorded in association with a Peer MAC Address 201 and Link Quality 202.

The Peer MAC Address 201 is terminal identification information for identifying a connection destination information processing apparatus.

The Link Quality 202 is information on communication quality of a connection destination information processing apparatus.

Here, the link quality information is transmitted to a broadcast address as described above. The frame used for this transmission may be a dedicated management frame and may be an existing management frame. When an existing management frame is used, the link quality information may be transmitted in a state of being included in a portion of the existing management frame.

For example, when an information processing apparatus that transmits link quality information is an access point or operates as a parent station (for example, a group owner), the link quality information can be transmitted using a portion of a beacon frame. A format example of the beacon frame in this case is illustrated in FIG. 4.

Link quality information which has passed a predetermined period or longer among the items of link quality information stored in the memory 160 may be deleted. Moreover, link quality information of which the communication quality value (reception level) is equal to or smaller than a predetermined value among the items of link quality information stored in the memory 160 may be deleted.

Format Example of Beacon Frame

Figure 4:
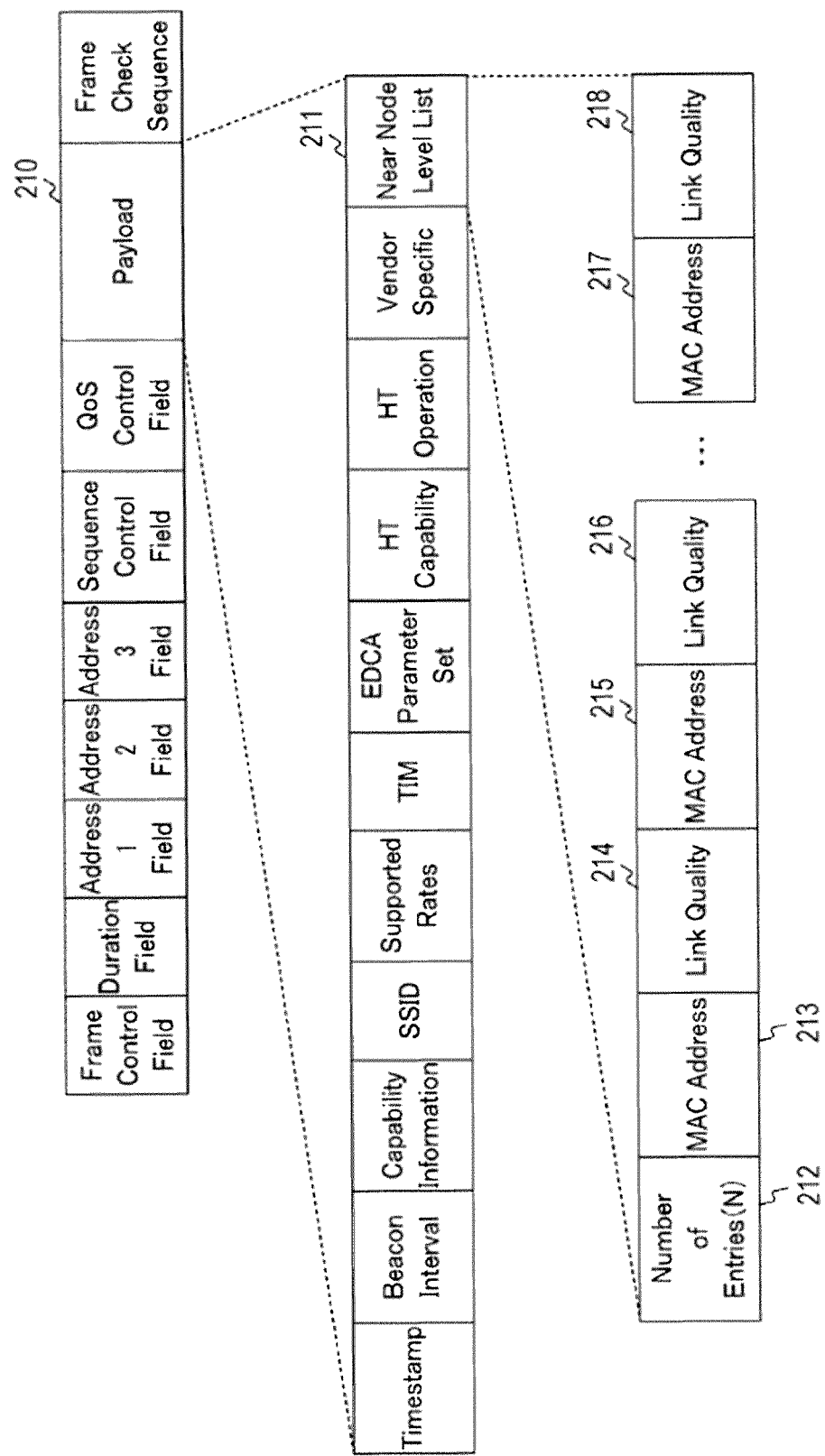
FIG. 4 is a diagram illustrating a format example of a beacon frame transmitted from respective information processing apparatuses that form a communication system 10 according to the first embodiment of the present technology.

FIG. 4 is a diagram illustrating a format example of a beacon frame transmitted from respective information processing apparatuses that form the communication system 10 according to the first embodiment of the present technology.

FIG. 4 illustrates an example of adding a new element (Near Node Level List 211) to a Payload 210. Moreover, the respective items of information (Peer MAC Address 201 and Link Quality 202) illustrated in FIG. 3 may be transmitted in a state of being carried in the Near Node Level List 211 in a list form. Specifically, the information of the Peer MAC Address 201 illustrated in FIG. 3 is stored in MAC Addresses 213, 215, and 217, and the information of the Link Quality 202 illustrated in FIG. 3 is stored in Link Qualities 214, 216, and 218.

Moreover, the number of combinations of MAC Address and Link Quality is stored in Number of Entries (N) 212.

For example, in the example illustrated in FIG. 1, it is assumed that the information processing apparatus 100 and the information processing apparatus 101 are in such a positional relation that the apparatuses can detect transmission from the information processing apparatus 102. Due to this, it is assumed that the information processing apparatus 100 and the information processing apparatus 101 can receive packets (including link quality information) from the information processing apparatus 102.

Moreover, the information processing apparatus 100 and the information processing apparatus 101 analyze the content of the packets transmitted from the information processing apparatus 102. Moreover, the information processing apparatus 100 and the information processing apparatus 101 store the link quality information (terminal identification information and communication quality of a connection destination information processing apparatus) and terminal identification information (for example, the MAC address) of an information processing apparatus that has transmitted the link quality information in a list form. The items of information stored in such a list form (link quality information management list) are updated sequentially at a point in time when the information is changed. An example of a link quality information management list is illustrated in FIG. 5.

Format Example of Link Quality Information Management List

FIG. 5 is a diagram illustrating a format example of a link quality information management list stored in the memory 160 according to the first embodiment of the present technology. In FIG. 5, in order to simplify the description, an example of the content for the information processing apparatus 101 that acquires and stores the link quality information transmitted from the information processing apparatus 100 is illustrated as the content of the link quality information management list.

The link quality information management list is information recorded in association with a MAC Address 1 (221), a MAC Address 2 (222), and a Link Quality 223.

The MAC Address 1 (221) is terminal identification information of an information processing apparatus that has transmitted link quality information.

The MAC Address 2 (222) is terminal identification information of a connection destination information processing apparatus included in the received link quality information.

The Link Quality 223 is communication quality included in the received link quality information.

The MAC Address 2 (222) and the Link Quality 223 correspond to the Peer MAC Address 201 and the Link Quality 202 illustrated in FIG. 3.

Here, a case where an information processing apparatus that stores a link quality information management list receives new link quality information from an information processing apparatus stored in the link quality information management list will be considered. In this case, the link quality information management list is updated based on the received new link quality information.

Moreover, the information processing apparatus that is not included in the received new link quality information may be deleted from the link quality information management list. Moreover, link quality information which has passed a predetermined period or longer among the items of link quality information stored in the link quality information management list may be deleted from the link quality information management list. Further, link quality information of which the communication quality value (reception level) is equal to or smaller than a predetermined value among the items of link quality information stored in the link quality information management list may be deleted from the link quality information management list.

Next, a RTS frame and a CTS frame exchanged between respective information processing apparatuses that form the communication system 10 will be described.

Format Example of RTS/CTS Frame

FIGS. 6A and 6B are diagrams illustrating a format example of RTS/CTS frames exchanged between respective information processing apparatuses that form the communication system 10 according to the first embodiment of the present technology.

In FIGS. 6A and 6B, a general format of a RTS frame and a CTS frame based on the IEEE 802.11 wireless LAN standard as an example is illustrated. FIG. 6A illustrates a format example of a RTS frame and FIG. 6B illustrates a format example of a CTS frame.

As illustrated in FIG. 6A, a RTS frame is made up of a plurality of fields. The plurality of fields include a Frame Control Field 231, a Duration Field 232, and a Receiver Address Field 233. Moreover, the plurality of fields include a Transmitter Address Field 234 and a Frame Check Sequence 235.

As illustrated in FIG. 6B, the CTS frame is made up of a plurality of fields. The plurality of fields include a Frame Control Field 241, a Duration Field 242, a Receiver Address Field 243, and a Frame Check Sequence 244.

Example of Transmission Suppression Using Carrier Sense

Here, a transmission suppression method called carrier sense will be described. Carrier sense is one of arbitration mechanisms for avoiding a packet collision and is used in an autonomous and decentralized wireless network, for example.

In carrier sense, an information processing apparatus monitors a surrounding wireless condition before performing a transmission operation and checks whether there is another information processing apparatus that performs transmission. When a reception power equal to or higher than a predetermined threshold is detected during the checking, the information processing apparatus determines that wireless condition is busy and stops the transmission operation so that actual transmission is not performed. This method is referred to as physical carrier sense, in particular.

Moreover, in an autonomous and decentralized wireless network, a second carrier sense mechanism is known as an arbitration mechanism for avoiding a packet collision.

The second carrier sense mechanism is a mechanism for describing a transmission suppression period in the content of a wireless packet to allow an information processing apparatus having received the packet to forcibly regard wireless condition as busy for the transmission suppression period after having received the packet to suppress transmission. Moreover, this method is also referred to as virtual carrier sense. In particular, the transmission suppression period is also referred to as a network allocation vector (NAV).

Here, in a specific state, it is not possible to avoid a collision sufficiently with application of physical carrier sense only. The specific state is such a state that transmission from another information processing apparatus in such a positional relation that it is not possible to detect signals directly results in a collision in a destination information processing apparatus. Two information processing apparatuses in such a positional relation are sometimes referred to as hidden information processing apparatuses. Moreover, the specific state is such a state that a wireless transmission is performed using a format of a signal in a new physical layer where it is not possible to detect a signal.

As described above, since it is not possible to avoid a collision sufficiently with application of physical carrier sense only, it is effective to apply virtual carrier sense in addition to physical carrier sense.

In this manner, when virtual carrier sense is also applied, a RTS frame or a CTS frame may be exchanged prior to transmission of a data frame and a NAV is described in the content thereof, whereby virtual carrier sense can be realized. For example, the value of NAV is described in the Duration Field 232 illustrated in FIG. 6A and the Duration Field 242 illustrated in FIG. 6B.

However, in the carrier sense method, when the number of information processing apparatuses in a network increases, transmission suppression may occur excessively and transmission efficiency of an overall system may decrease.

A positional relation that causes such a situation will be described with reference to FIG. 1.

In the example illustrated in FIG. 1, it is assumed that the information processing apparatus 100 and the information processing apparatus 101 are connected, the information processing apparatus 102 and the information processing apparatus 103 are connected, and respective apparatuses communicate with each other.

Here, as indicated by a physical carrier sense detection range 11, it is assumed that the information processing apparatus 100 is in such a positional relation that the information processing apparatus 100 can detect transmission from the information processing apparatuses 101, 102, and 103 based on physical carrier sense. Moreover, as indicated by a physical carrier sense detection range 12, it is assumed that the information processing apparatus 101 is in such a positional relation that the information processing apparatus 101 can detect transmission from the information processing apparatuses 100 and 102 based on physical carrier sense. Further, as indicated by a physical carrier sense detection range 13, it is assumed that the information processing apparatus 102 is in such a positional relation that the information processing apparatus 102 can detect transmission from the information processing apparatuses 100, 101, and 103 based on physical carrier sense. Further, as indicated by a physical carrier sense detection range 14, it is assumed that the information processing apparatus 103 is in such a positional relation that the information processing apparatus 103 can detect transmission from the information processing apparatuses 100 and 102 based on physical carrier sense.

Here, a case where the information processing apparatus 102 performs an operation of transmitting data to the information processing apparatus 103 will be considered. In this case, since the information processing apparatus 100 detects transmission of the information processing apparatus 102 during transmission of the information processing apparatus 102, the transmission of the information processing apparatus 100 is suppressed. Due to this, it is difficult that the information processing apparatus 100 performs transmission until transmission of the information processing apparatus 102 ends.

Figure 7:
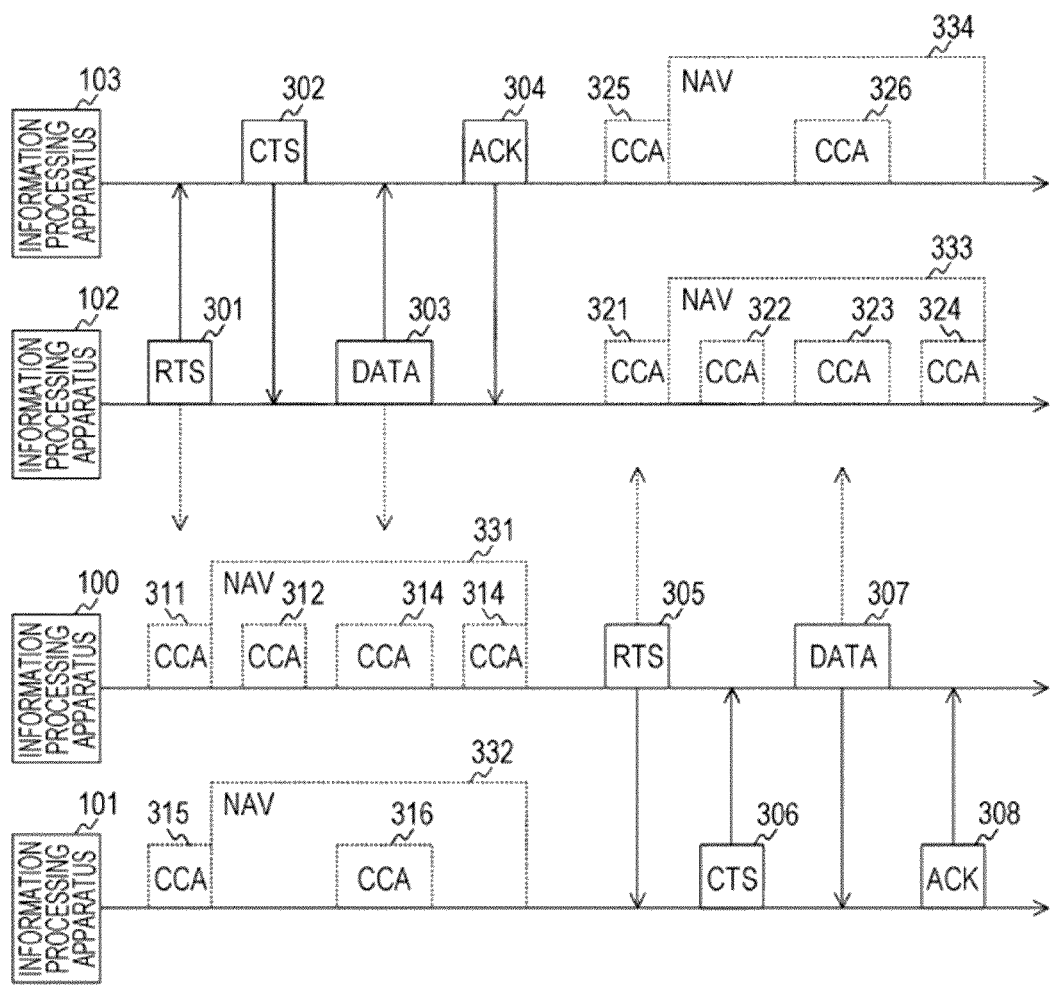
FIG. 7 is a diagram illustrating, in time-series manner, an example of a packet transmission/reception process and a transmission suppression process between respective information processing apparatuses that form the communication system 10 according to the first embodiment of the present technology.

Moreover, a case where virtual carrier sense which uses RTS/CTS procedures is performed will be considered. In this case, for an information processing apparatus that has received at least one of a RTS frame and a CTS frame, transmission suppression is set during the frame. Further, for an information processing apparatus that has received at least one of a RTS frame and a CTS frame, transmission suppression is set until transmission and reception of a data frame subsequent to the frame and an acknowledgement frame (ACK frame) associated therewith is completed. FIG. 7 illustrates these transmission suppressions in a time-series manner.

Example of Packet Transmission/Reception Process and Transmission Suppression Process FIG. 7 is a diagram illustrating, in a time-series manner, an example of a packet transmission/reception process and a transmission suppression process between respective information processing apparatuses that form the communication system 10 according to the first embodiment of the present technology. The horizontal axis illustrated in FIG. 7 represents a time axis.

In FIG. 7, segments represented by dotted rectangles 311 to 316 and 321 to 326 in which clear channel assessment (CCA) is described are segments in which transmission suppression is set by physical carrier sense. Moreover, segments represented by dotted rectangles 331 to 334 in which NAV is described are segments in which transmission suppression is set by virtual carrier sense.

As illustrated in FIG. 7, a case where the information processing apparatus 102 obtains a transmission right first and starts transmitting data to the information processing apparatus 103 will be considered. In this case, a series of frames (the RTS frame (301), the CTS frame (302), the data frame (303), and the ACK frame (304)) are exchanged between the information processing apparatus 102 and the information processing apparatus 103. Due to this, transmission of the information processing apparatus 100 is suppressed until the exchange of a series of frames (301 to 304) between the information processing apparatus 102 and the information processing apparatus 103 finishes. The information processing apparatus 100 can perform a transmission operation (305 to 308) after the exchange of a series of frames (301 to 304) between the information processing apparatus 102 and the information processing apparatus 103 finishes.

Here, in the receiving-side information processing apparatus when data communication is performed, the success rate of reception is determined by the ratio of desired wave to interference wave. For example, in the example illustrated in FIG. 7, the desired wave for the receiving-side information processing apparatus 101 is electric wave transmitted from the information processing apparatus 100 to the information processing apparatus 101. Moreover, the interference wave for the receiving-side information processing apparatus 101 is electric wave transmitted from the information processing apparatus 100 to the information processing apparatus 103 and electric wave transmitted from the information processing apparatus 102 to the information processing apparatus 101. Further, the desired wave for the receiving-side information processing apparatus 103 is electric wave transmitted from the information processing apparatus 102 to the information processing apparatus 103. Further, the interference wave for the receiving-side information processing apparatus 103 is electric wave transmitted from the information processing apparatus 100 to the information processing apparatus 103 and electric wave transmitted from the information processing apparatus 102 to the information processing apparatus 101.

For example, in the example illustrated in FIG. 1, a case where the distance between the information processing apparatus 101 and the information processing apparatus 102 is larger than the distance between the information processing apparatus 101 and the information processing apparatus 100 will be considered. In this case, even when the information processing apparatus 100 transmits data to the information processing apparatus 101 during transmission of the information processing apparatus 102, it is expected that the information processing apparatus 101 is highly likely to receive the data.

However, in such a case, during transmission of the information processing apparatus 102, the transmission of the information processing apparatus 100 is suppressed. In this manner, in a carrier sense mechanism, in order to avoid collisions reliably, transmission is suppressed even in a state where improvements could have been achieved potentially.

Thus, the physical carrier sense detection thresholds of the information processing apparatuses 100 and 102 may be set as high as possible so that the mutual transmission electric waves are not detected. In this case, the possibility that the information processing apparatus 100 detects transmission from the information processing apparatus 102 decreases and the information processing apparatuses can perform transmission simultaneously and reuse wireless resources.

However, if the physical carrier sense detection threshold is set to be high in such a uniform manner, transmissions from many information processing apparatuses may be induced and interference may occur excessively. In this case, collisions may occur frequently and a network may break down. Due to this, it is preferable to change the physical carrier sense detection threshold only when it is necessary or when reliable improvement is expected.

Moreover, when virtual carrier sense is used together with physical carrier sense and NAV is set once, even if the physical carrier sense detection threshold is changed after that, since transmission suppression remains valid, improvements may not be obtained.

As described above, carrier sense comes in two types which are physical carrier sense that makes determination based on strength of a detected signal and virtual carrier sense that forcibly applies transmission suppression by designating a time period. Moreover, these two methods may be used together to greatly reduce the probability of packet collisions.

However, if the number of information processing apparatuses that form a network increases, transmission suppression may occur excessively and transmission efficiency of an overall system may decrease.

Thus, in the embodiment of the present technology, an example of reusing wireless resources while suppressing side effects of a high physical carrier sense detection threshold as much as possible is illustrated. Moreover, in the embodiment of the present technology, an example of a method of reusing wireless resources, applicable even when virtual carrier sense is used also is illustrated.

Operation Example of Information Processing Apparatus

Next, the operation of the information processing apparatus 100 will be described. In the following description, although the operation example of the information processing apparatus 100 is mainly described, the same can be applied to the other information processing apparatuses.

Notification Example of Link Quality Information

Figure 8:
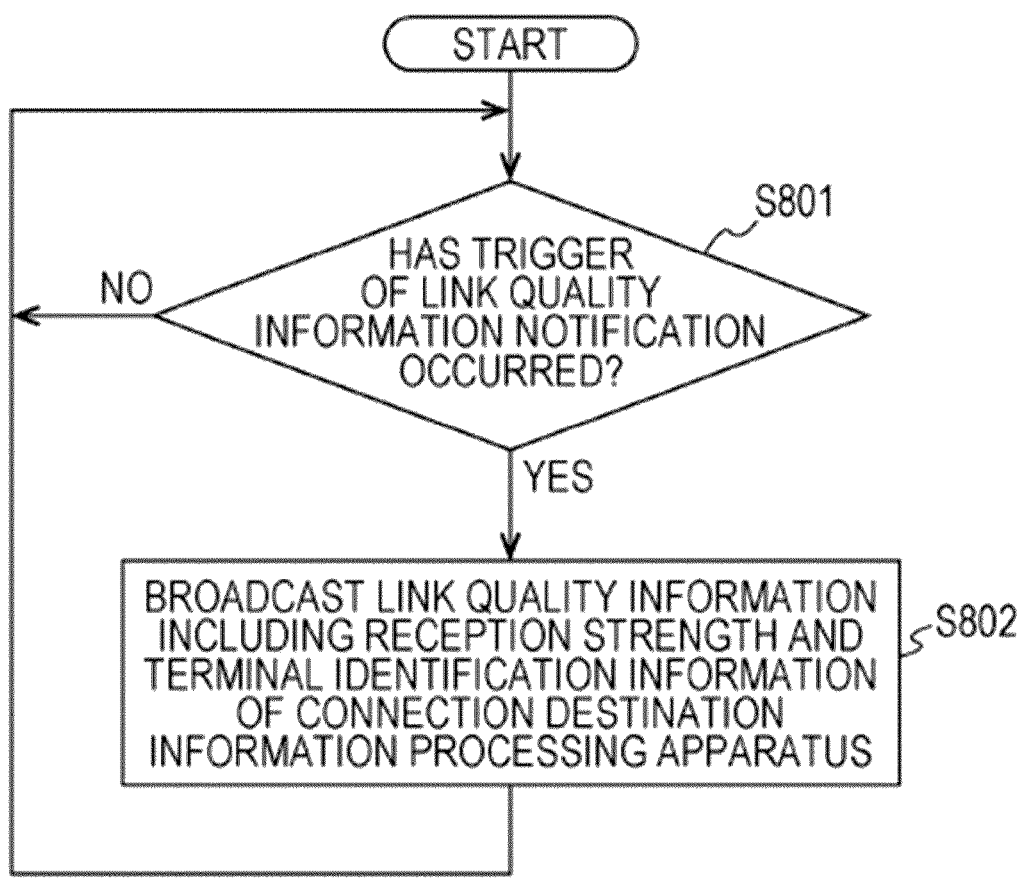
FIG. 8 is a flowchart illustrating an example of a processing procedure of a link quality information notification process of an information processing apparatus 100 according to the first embodiment of the present technology.

FIG. 8 is a flowchart illustrating an example of a processing procedure of a link quality information notification process of the information processing apparatus 100 according to the first embodiment of the present technology.

First, the control unit 150 determines whether a trigger for notifying link quality information has occurred (step S801). When the trigger has not occurred (step S801), the control unit 150 continues monitoring.

Moreover, when a trigger for notifying the link quality information has occurred (step S801), the control unit 150 performs control of broadcasting link quality information (step S802). For example, the respective items of information illustrated in FIG. 3 are broadcast as the link quality information.

Recording Example of Link Quality Information

Figure 9:
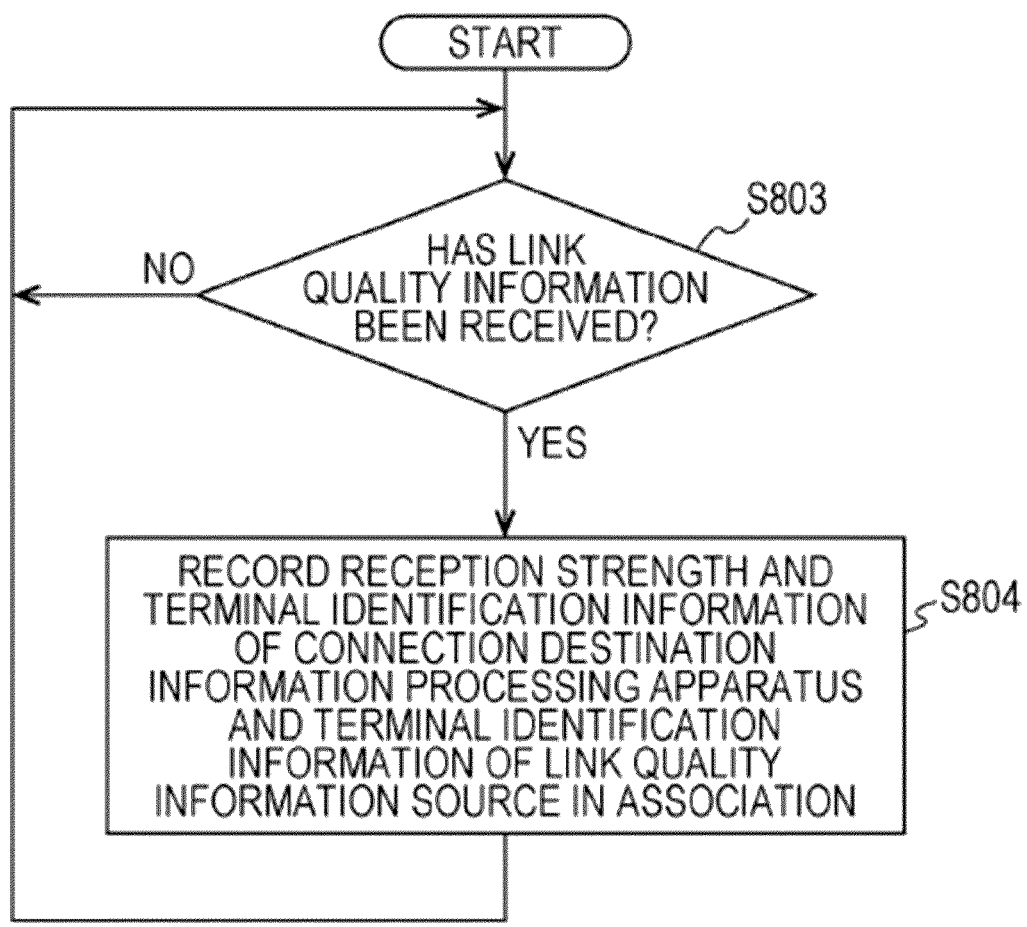
FIG. 9 is a flowchart illustrating an example of a processing procedure of a link quality information recording process of the information processing apparatus 100 according to the first embodiment of the present technology.

FIG. 9 is a flowchart illustrating an example of a processing procedure of a link quality information recording process of the information processing apparatus 100 according to the first embodiment of the present technology.

First, the control unit 150 determines whether link quality information has been received (step S803). When the link quality information has not been received (step S803), the control unit 150 continues monitoring.

Moreover, when the link quality information has been received (step S803), the control unit 150 performs control of storing the received link quality information in the memory 160 (step S804). For example, the control unit 150 stores the respective items of information (for example, the items of information illustrated in FIG. 3) included in the received link quality information in the memory 160 in association with terminal identification information of an information processing apparatus that has transmitted the link quality information. For example, the respective items of information are stored in the link quality information management list illustrated in FIG. 5.

The information processing apparatuses that form the communication system 10 perform preprocessing illustrated in FIGS. 8 and 9 periodically or non-periodically. A case where after the preprocessing is performed, communication, based on the RTS/CTS procedure, between the information processing apparatus 102 and the information processing apparatus 103 starts will be considered. For example, the information processing apparatus 102 transmits a RTS frame of which the destination is the information processing apparatus 103, whereby communication between the information processing apparatus 102 and the information processing apparatus 103 starts.

In this manner, when a RTS frame of which the destination is the information processing apparatus 103 is transmitted from the information processing apparatus 102, transmission suppression is set to the information processing apparatus 100 and the information processing apparatus 101 due to the RTS frame (a RTS frame of which the destination is not a subject apparatus). Thus, in the embodiment of the present technology, an example of reusing wireless resources in accordance with a situation in a state where a transmission/reception request has occurred between the information processing apparatus 100 and the information processing apparatus 101 is illustrated.

Example of Wireless Resource Reusing Process

Figure 10:
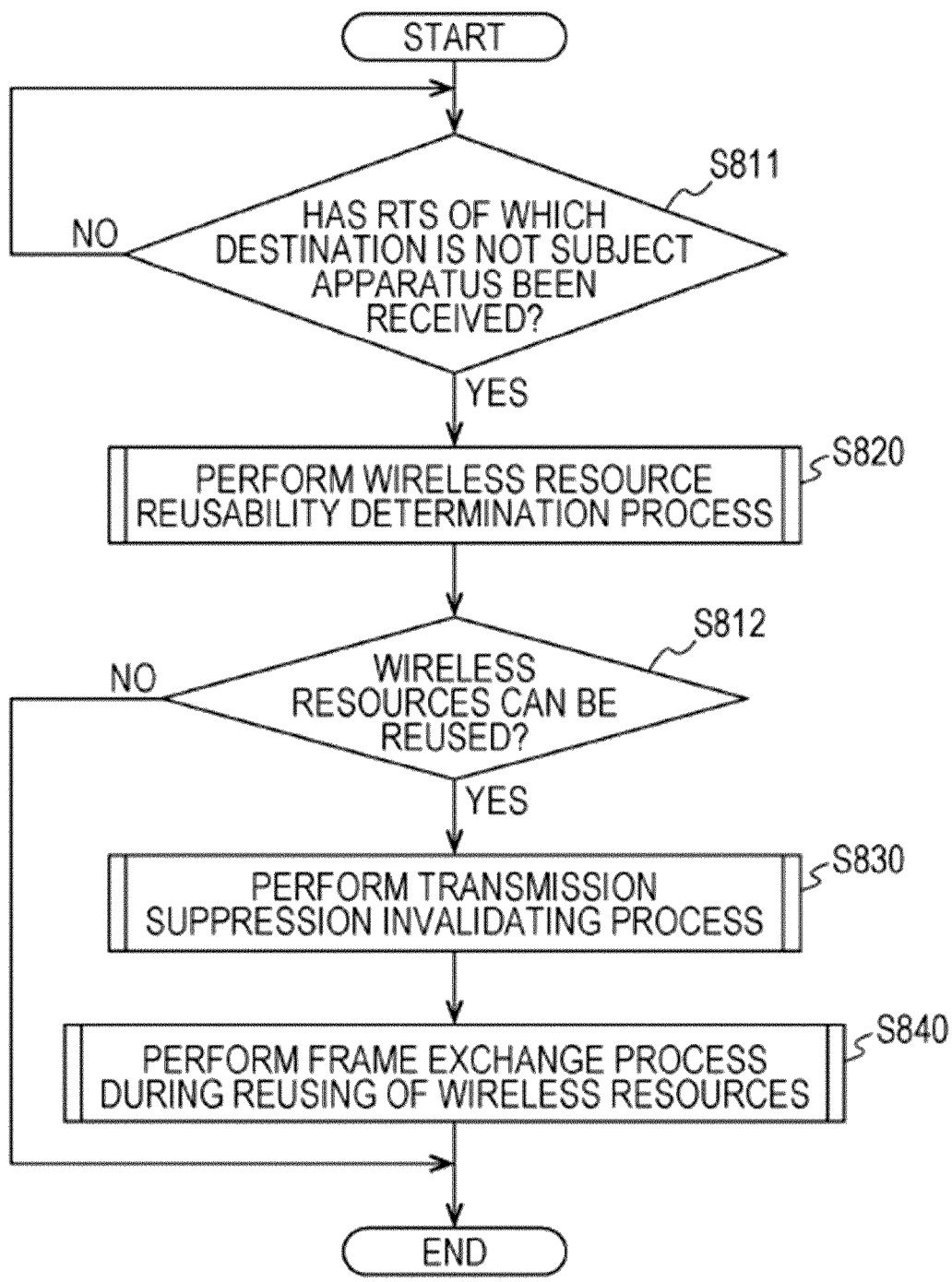
FIG. 10 is a flowchart illustrating an example of a processing procedure of a wireless resource reusing process of the information processing apparatus 100 according to the first embodiment of the present technology.

FIG. 10 is a flowchart illustrating an example of a processing procedure of a wireless resource reusing process of the information processing apparatus 100 according to the first embodiment of the present technology.

First, the control unit 150 determines whether a RTS frame of which the destination is not a subject apparatus has been received (step S811). When the RTS frame of which the destination is not a subject apparatus has not been received (step S811), the control unit 150 continues monitoring.

When the RTS frame of which the destination is not the subject apparatus has been received (step S811), a wireless resource reusability determination process is performed (step S820). The wireless resource reusability determination process will be described in detail with reference to FIG. 11. Moreover, when a RTS frame of which the destination is not the subject apparatus has been received (step S811), the control unit 150 sets NAV.

Subsequently, the control unit 150 performs a wireless resource reusability determination process to determine whether wireless resources can be reused (step S812). When it is determined that it is not possible to reuse wireless resources (step S812), the control unit 150 ends the operation of the wireless resource reusing process.

When it is determined that wireless resources can be reused (step S812), a transmission suppression invalidating process is performed (step S830) and a frame exchange process during reusing of wireless resources is performed (step S840). The transmission suppression invalidating process will be described in detail with reference to FIG. 12. Moreover, the frame exchange process during reusing of wireless resources will be described in detail with reference to FIG. 13. Steps S811, S812, S820, and S830 are examples of a process of clearing transmission suppression described in the claims.

Example of Wireless Resource Reusability Determination Process

Figure 11:
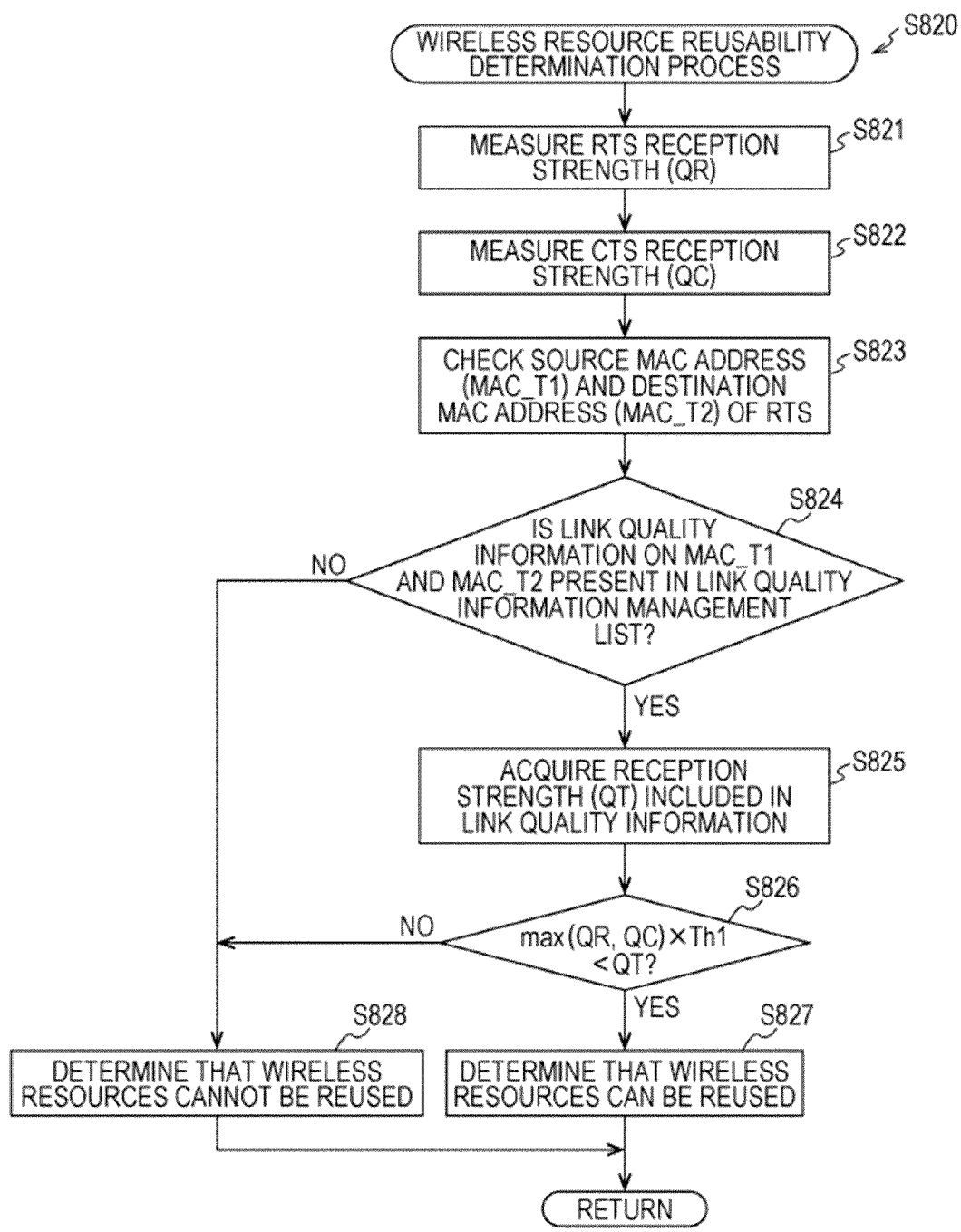
FIG. 11 is a flowchart illustrating a wireless resource reusability determination process within the processing procedure of the wireless resource reusing process of the information processing apparatus 100 according to the first embodiment of the present technology.

FIG. 11 is a flowchart illustrating a wireless resource reusability determination process within the processing procedure of the wireless resource reusing process of the information processing apparatus 100 according to the first embodiment of the present technology. The wireless resource reusability determination process corresponds to a processing procedure of step S820 illustrated in FIG. 10. Moreover, the wireless resource reusability determination process is executed by an information processing apparatus (wireless resource reusing apparatus) in which a transmission request occurs in a state where NAV is set, for example.

As described above, when a RTS frame of which the destination is not a subject apparatus has been received, NAV is set in the information processing apparatus 100. Moreover, the control unit 150 measures the reception strength (QR) of the RTS frame (step S821) and measures the reception strength (QC) of a CTS frame transmitted after the elapse of a predetermined period from reception of the RTS frame (step S822). The predetermined period is a fixed period determined in the standard. For example, in the institute of electrical and electronic engineers (IEEE) 802.11 standards, a period called a short inter frame space (SIFS) corresponds to the predetermined period.

A case where it is not possible to receive a CTS frame transmitted after the elapse of a predetermined period from reception of a RTS frame and to measure the reception strength (QC) of the CTS frame may also happen. In this case, the packet detection threshold (setting value) of the physical carrier sense is used instead of the reception strength (QC) of the CTS frame. Moreover, even when it was not possible to receive packets normally as the CTS frame, a case where it is possible to measure the reception strength (that is, in this case, a noise power level at that time period) in an estimated arrival time period of the CTS frame may also happen. In this case, the measured reception strength may be used instead of the reception strength (QC) of the CTS frame. These values are examples of the communication quality corresponding to the carrier sense detection threshold.

Moreover, the control unit 150 stores the measured reception strength (QR) of the RTS frame and the measured reception strength (QC) of the CTS frame in the memory 160.

Subsequently, the control unit 150 checks a source MAC address (MAC_T1) and a destination MAC address (MAC_T2) of the RTS frame from the MAC header of the received RTS frame (step S823).

Subsequently, the control unit 150 refers to the link quality information management list stored in the memory 160 to determine whether the link quality information between MAC_T1 and MAC_T2 is present (step S824). When the link quality information between MAC_T1 and MAC_T2 is not present (step S824), the control unit 150 determines that it is not possible to reuse wireless resources (step S828) and ends the operation of the wireless resource reusability determination process.

When the link quality information between MAC_T1 and MAC_T2 is present (step S824), the control unit 150 reads the reception strength (QT) included in the link quality information (step S825).

Subsequently, the control unit 150 compares the read reception strength (QT) with the measured reception strength (QR) of the RTS frame and the measured reception strength (QC) of the CTS frame (step S826). The measured RTS frame reception strength (QR) and the measured CTS frame reception strength (QC) are stored in the memory 160.

Specifically, the control unit 150 determines whether Expression 1 below is satisfied.

$$\max(QR, QC) \times Th1 < QT \quad \text{Expression 1}$$

max(QR,QC) means the value of an element having the larger value among two elements (QR and QC).

Moreover, the threshold Th1 is a threshold for determining whether the measured RTS frame reception strength (QR) and the measured CTS frame reception strength (QC) are sufficiently weaker than the communication quality between the information processing apparatuses in which NAV is set. For example, when a signal having reception power of QT and a signal having reception power of the larger one of QR and QC were received simultaneously, such a reception level ratio that there is no influence on reception of the former signal is set as the threshold Th1. Specifically, the threshold Th1 can be set to a value of approximately 10 dB to 30 dB, for example.

When Expression 1 is satisfied (step S826), the control unit 150 determines that it is possible to reuse wireless resources (step S827). On the other hand, when Expression 1 is not satisfied (step S826), it may not be possible to secure sufficient quality during simultaneous communication and the communication between the information processing apparatus 102 and the information processing apparatus 103 may be inhibited. Due to this, the control unit 150 determines that it is not possible to use wireless resources (step S828).

Example of Transmission Suppression Invalidating Process

Figure 12:
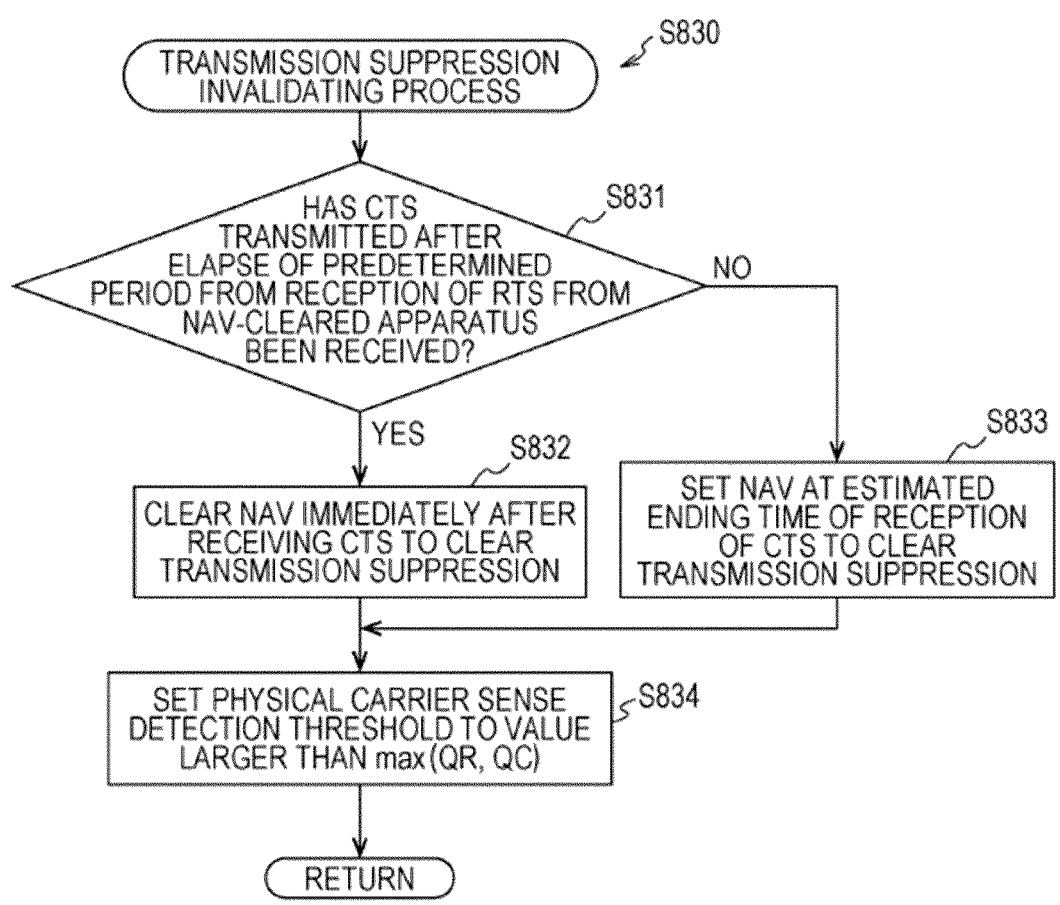
FIG. 12 is a flowchart illustrating a transmission suppression invalidating process within the processing procedure of the wireless resource reusing process of the information processing apparatus 100 according to the first embodiment of the present technology.

FIG. 12 is a flowchart illustrating a transmission suppression invalidating process (a processing procedure of step S830 illustrated in FIG. 10) within the processing procedure of the wireless resource reusing process of the information processing apparatus 100 according to the first embodiment of the present technology.

As illustrated in FIG. 11, an information processing apparatus (wireless resource reusing apparatus) which is determined to be able to reuse wireless resources clears NAV-based transmission suppression set to the subject apparatus immediately after completion of reception of CTS. In this manner, an information processing apparatus in which NAV is cleared is referred to as a NAV-cleared apparatus. For example, FIG. 12 illustrates an example in which the information processing apparatuses 100 and 101 are wireless resource reusing apparatuses and the information processing apparatuses 102 and 103 are NAV-cleared apparatuses.

First, the control unit 150 determines whether a CTS frame transmitted after the elapse of a predetermined period from the reception of a RTS frame from an information processing apparatus (NAV-cleared apparatus) in which NAV is set has been received (step S831).

When the CTS frame has been received (step S831), the control unit 150 clears NAV-based transmission suppression set to the subject apparatus immediately after reception of the CTS frame (step S832). Moreover, when the CTS frame has not been received (step S831), the control unit 150 sets NAV at an estimated reception end time of the CTS frame to clear transmission suppression (step S833).

In this manner, when NAV-based transmission suppression is cleared, although the virtual carrier sense between the information processing apparatus 100 and the information processing apparatus 101 is cleared, physical carrier sense remains valid. Due to this, when the data frame between the information processing apparatus 102 and the information processing apparatus 103 is detected after the CTS frame is received, a carrier sensing result of being busy is obtained and transmission suppression is set again.

Thus, in order to invalidate the transmission suppression, the control unit 150 changes the physical carrier sense detection threshold together with clearing NAV (step S834). Specifically, the control unit 150 sets the physical carrier sense detection threshold so as to be larger than max(QR, QC) (step S834).

Figure 13:
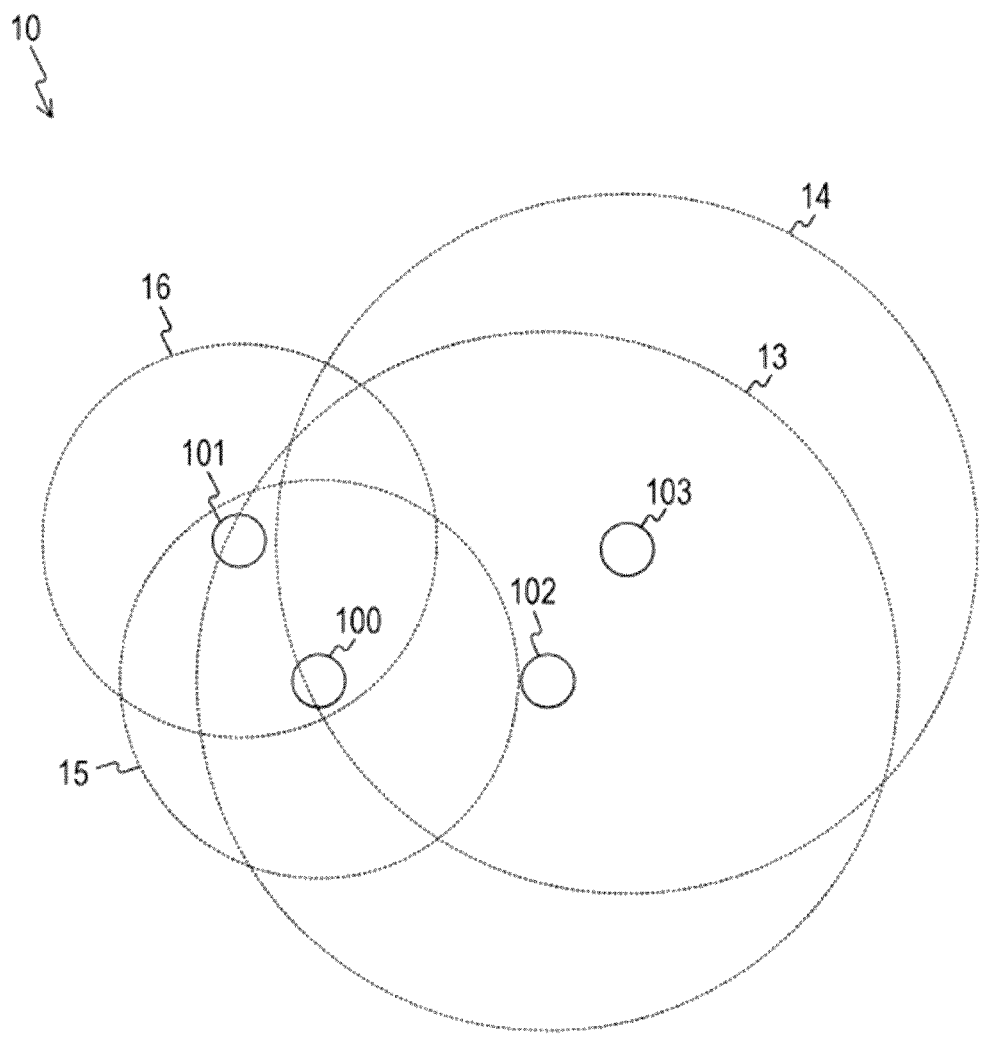
FIG. 13 is a diagram illustrating a system configuration example of the communication system 10 according to the first embodiment of the present technology.

FIG. 13 illustrates an example of physical carrier sense detection ranges (signal detection ranges) of respective information processing apparatuses when the physical carrier sense detection threshold is changed.

Change Example of Physical Carrier Sense Detection Range

FIG. 13 is a diagram illustrating a system configuration example of the communication system 10 according to the first embodiment of the present technology.

FIG. 13 illustrates an example of physical carrier sense detection ranges of respective information processing apparatuses after a transmission suppression invalidating process is performed. FIG. 13 illustrates an example in which physical carrier sense detection ranges 11 and 12 among the physical carrier sense detection ranges 11 to 14 illustrated in FIG. 1 are changed to physical carrier sense detection ranges 15 and 16.

In this manner, the physical carrier sense detection range 15 of the information processing apparatus 100 and the physical carrier sense detection range 16 of the information processing apparatus 101 can be narrowed. Moreover, it is possible to prevent the information processing apparatus 100 and the information processing apparatus 101 from detecting data frames between the information processing apparatus 102 and the information processing apparatus 103.

Example of Frame Exchange Process During Reusing of Wireless Resources

Figure 14:
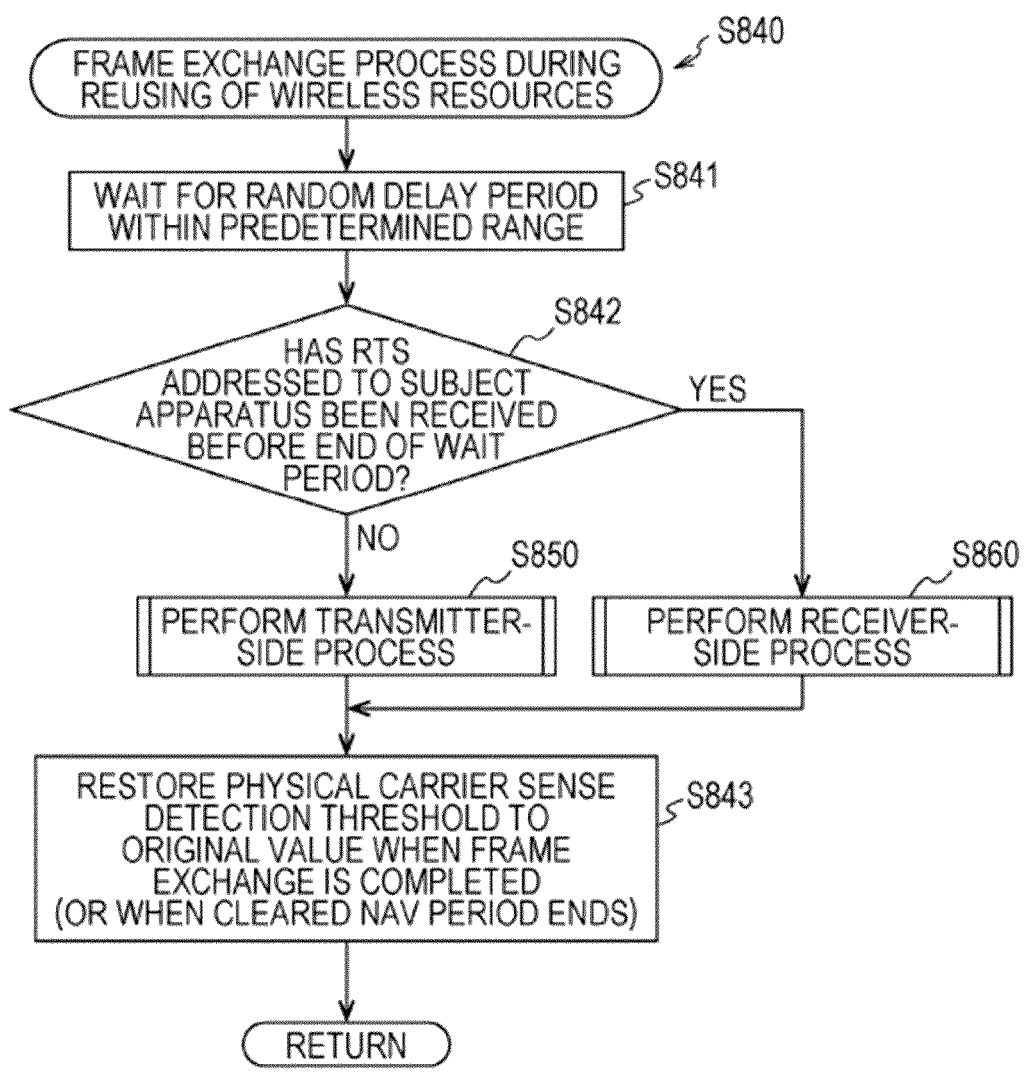
FIG. 14 is a flowchart illustrating a frame exchange process during reusing of wireless resources within the processing procedure of the wireless resource reusing process of the information processing apparatus 100 according to the first embodiment of the present technology.

FIG. 14 is a flowchart illustrating a frame exchange process during reusing of wireless resources within the processing procedure of the wireless resource reusing process of the information processing apparatus 100 according to the first embodiment of the present technology. The frame exchange process during reusing of wireless resources corresponds to a processing procedure of step S840 illustrated in FIG. 10.

Here, when the frame exchange process during reusing of wireless resources illustrated in FIG. 14 is performed, although it is a time period in which transmission suppression is set to an information processing apparatus where the transmission suppression invalidating process (step S830) is performed, the transmission suppression is cleared and the information processing apparatus can perform transmission.

In this manner, an information processing apparatus (wireless resource reusing apparatus) in which transmission suppression is cleared and which can perform transmission transmits and receives data when there is data to be transmitted and a predetermined condition is satisfied. For example, it is checked whether the subject apparatus can transmit and receive data with sufficient quality and whether the exchange of frames to be transmitted ends until the exchange of frames of the NAV-cleared apparatus ends in order to completely avoid the influence of other information processing apparatuses. When the checking result satisfies a predetermined condition, data is transmitted and received.

Here, the data to be transmitted is not limited to data of which the frame type is a data frame. For example, a management frame such as Action frame in IEEE 802.11, may be transmitted.

Moreover, there is a possibility that transmission suppression of some of information processing apparatuses that have to receive frames is not cleared and some information processing apparatuses do not receive the frame. Thus, when the transmission target data is a broadcast or multicast frame, the wireless resource reusing apparatus may not transmit data during reusing of wireless resources.

Here, in the wireless resource reusability determination process, a case where a plurality of information processing apparatuses that satisfies the same conditions is present may happen. In this case, it is necessary to prevent collisions of the transmissions from a plurality of information processing apparatuses. Thus, frame exchange starts after waiting for a standby period within a certain range defined by a predetermined procedure from clearing of two types of transmission suppression described above (step S841). The standby period within a certain range defined by a predetermined procedure may be a random delay period within a certain range, for example.

After waiting for the standby period (step S841), the control unit 150 determines whether a RTS frame addressed to the subject apparatus has been received before the end of the wait period (step S842). When the RTS frame has not been received (step S842), a transmitter-side process is performed (step S850). The transmitter-side process will be described in detail with reference to FIG. 15. Moreover, when the RTS frame has been received (step S842), a receiver-side process is performed (step S860). The receiver-side process will be described in detail with reference to FIG. 16.

After the transmitter-side process (step S850) or the receiver-side process (step S860) is performed, the control unit 150 restores the physical carrier sense detection threshold to an original value (step S843). That is, the control unit 150 restores the physical carrier sense detection threshold to an original value when frame exchange is completed or when the cleared NAV period ends (step S843).

Example of Transmitter-Side Process

Figure 15:
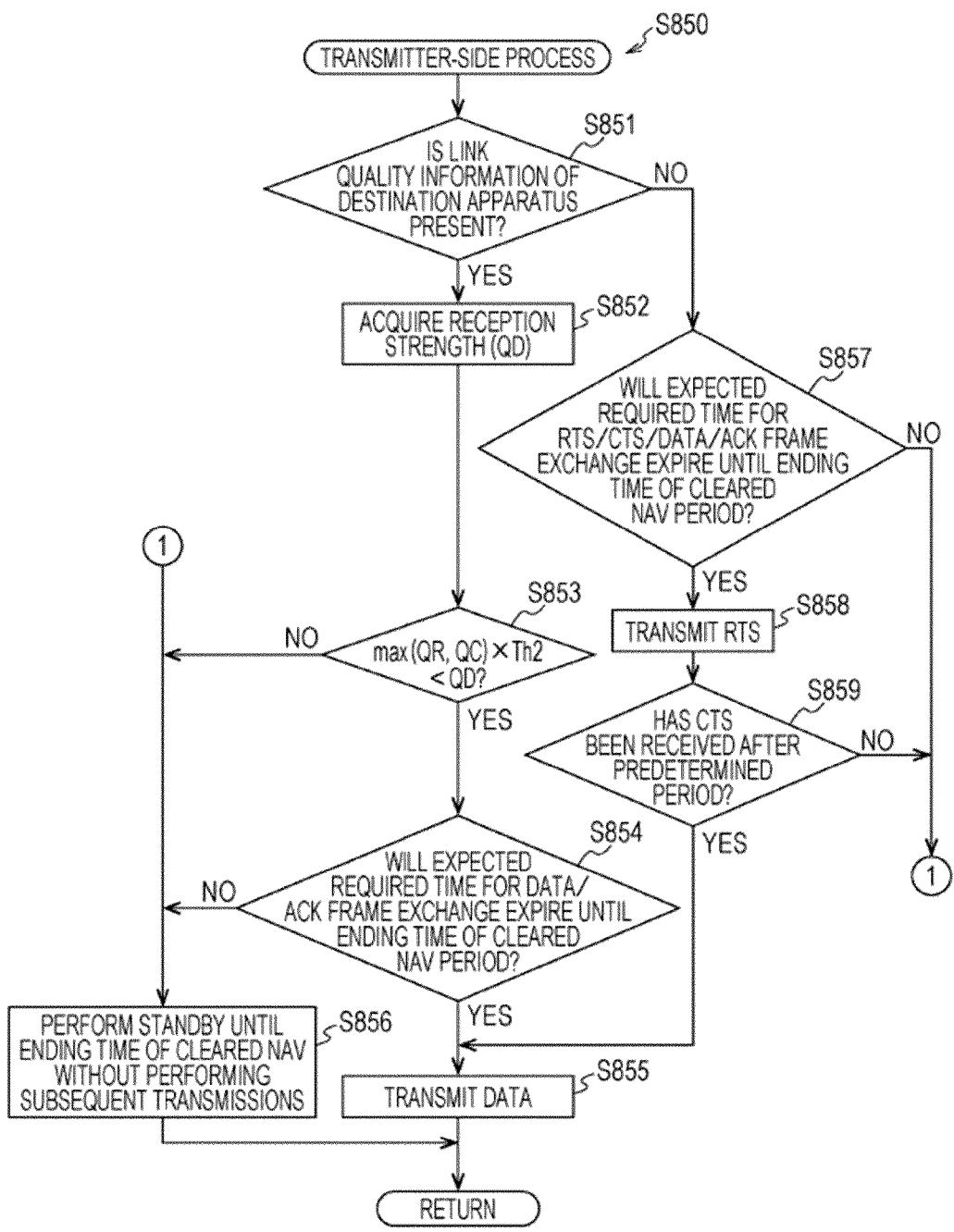
FIG. 15 is a flowchart illustrating a transmitter-side process within the processing procedure of the wireless resource reusing process of the information processing apparatus 100 according to the first embodiment of the present technology.

FIG. 15 is a flowchart illustrating a transmitter-side process (a processing procedure of step S850 illustrated in FIG. 14) within the processing procedure of the wireless resource reusing process of the information processing apparatus 100 according to the first embodiment of the present technology. FIG. 15 illustrates a case where data to be transmitted to the information processing apparatus 100 is present.

First, the control unit 150 checks whether the subject apparatus can transmit and receive data with sufficient communication quality. Specifically, the control unit 150 determines whether link quality information on past transmission and reception between the subject apparatus and an information processing apparatus (destination apparatus) corresponding to a transmission destination of data is present in the memory 160 (step S851).

When the link quality information of the destination apparatus is present in the memory 160 (step S851), the control unit 150 acquires the link quality information (that is, the reception strength (reception strength (QD) of desired signal) from the connection destination information processing apparatus) (step S852). Here, the information processing apparatus 100 may have information on the transmission power of a destination apparatus using a certain method. In such a case, a difference between the transmission power of the destination apparatus and the transmission power of the subject apparatus (the information processing apparatus 100) may be calculated and the link quality information may be corrected using the difference to obtain QD.

Subsequently, the control unit 150 compares the read reception strength (QD) with the measured RTS frame reception strength (QR) and the measured CTS frame reception strength (QC) (step S853). The measured RTS frame reception strength (QR) and the measured CTS frame reception strength (QC) are stored in the memory 160.

Specifically, the control unit 150 determines whether Expression 2 below is satisfied.

$$\max(QR, QC) \times Th2 < QD \quad \text{Expression 2}$$

Moreover, the threshold Th2 is a threshold for determining whether the measured RTS frame reception strength (QR) and the measured CTS frame reception strength (QC) are sufficiently weaker than the communication quality of transmission that the subject apparatus is about to perform. For example, when a signal having reception power of QD and a signal having reception power of the larger one of QR and QC were received simultaneously, such a reception level ratio that there is no influence on reception of the former signal is set as the threshold Th2. Specifically, the threshold Th2 can be set to a value of approximately 10 dB to 30 dB, for example.

When Expression 2 is satisfied (step S853), it is expected that sufficient communication quality is secured even when simultaneous transmission is performed. On the other hand, when Expression 2 is not satisfied (step S853), transmission errors may occur and unnecessary interferences may increase. Due to this, when Expression 2 is not satisfied (step S853), the control unit 150 performs standby until the ending time of the cleared NAV without transmitting data frames (step S856). During this standby period, the control unit 150 regards the wireless channel state as being busy.

Moreover, when Expression 2 is satisfied (step S853), the control unit 150 calculates the time necessary for frame exchange necessary for transmission of the data and determines whether the frame exchange will be completed until the estimated ending time of the cleared NAV period (step S854).

When it is determined that the frame exchange will be completed until the estimated ending time of the cleared NAV period (step S854), the control unit 150 proceeds to actual frame exchange and transmits data (step S855).

When it is determined that the frame exchange will not be completed until the estimated ending time of the cleared NAV period (step S854), the control unit 150 performs standby until the NAV clear period without transmitting frames during the NAV clear period (step S856). During this standby period, the control unit 150 regards the wireless channel state as being busy.

Here, a technique (for example, frame aggregation) of connecting a plurality of frames may be used together. In such a case, the number of connected frames may be adjusted so that the time necessary for frame exchange has such a value that transmission can be completed during the NAV clear period, and then, it may be determined that the transmission can be completed.

Moreover, when the link quality information of the destination apparatus is not present in the memory 160 (step S851), the RTS/CTS procedure is used for transmission of data frames at all times. The control unit 150 calculates the time necessary for frame exchange necessary for transmission of the data and determines whether transmission of the data will be completed until the estimated ending time of the cleared NAV period (step S857). In this case, the time necessary for frame exchange to be calculated is calculated so as to include the RTS/CTS period.

When it is determined that the time necessary for frame exchange will expire until the estimated ending time of the cleared NAV period (step S857), the control unit 150 proceeds to actual frame exchange. However, in order to check whether the subject apparatus can perform transmission and reception with sufficient communication quality, the control unit 150 transmits a RTS frame prior to transmission of data frames (step S858).

Subsequently, the control unit 150 determines whether the CTS frame has been received after the elapse of a predetermined period from transmission of the RTS frame (step S859). When the CTS frame has been received after the elapse of a predetermined period (step S859), the control unit 150 performs a data transmission process of transmitting data (step S855). Moreover, when the CTS frame has not been received after the elapse of a predetermined period (step S859), the flow proceeds to step S856.

Moreover, when it is determined that the time necessary for frame exchange will not expire until the estimated ending time of the cleared NAV period (step S857), the flow proceeds to step S856.

Example of Receiver-Side Process

Figure 16:
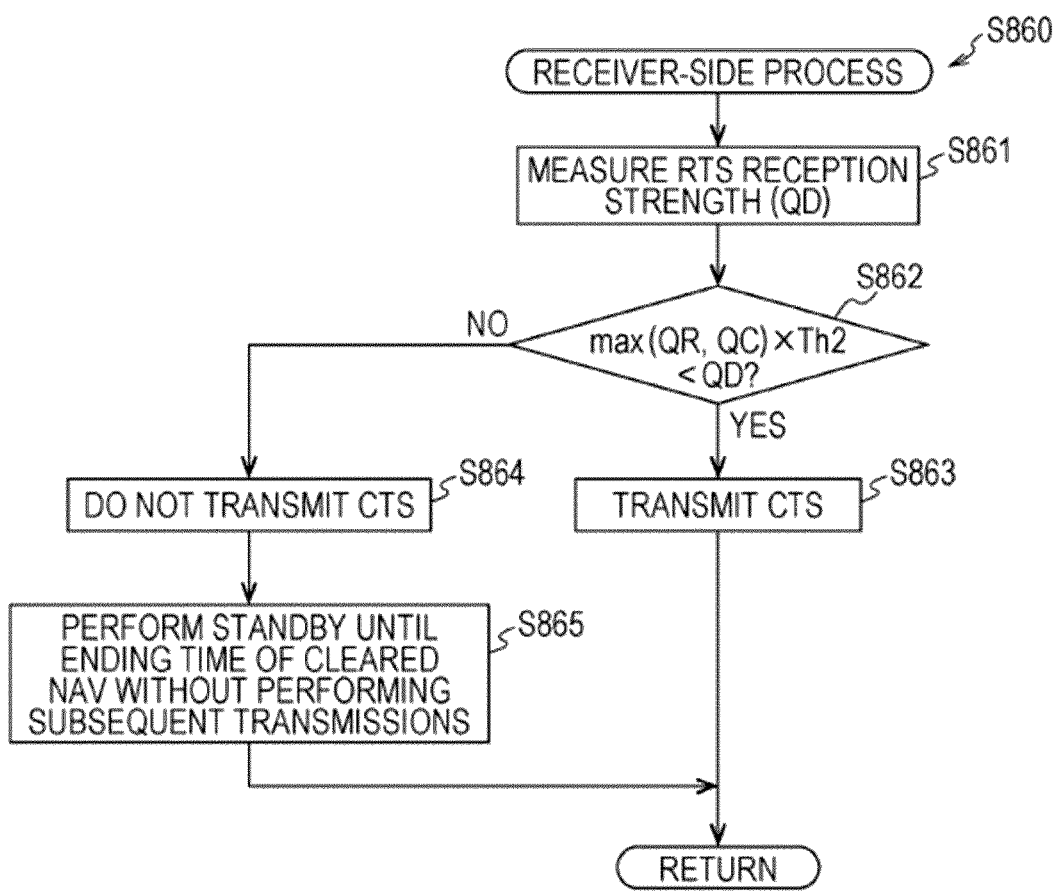
FIG. 16 is a flowchart illustrating a receiver-side process within the processing procedure of the wireless resource reusing process of the information processing apparatus 100 according to the first embodiment of the present technology.

FIG. 16 is a flowchart illustrating a receiver-side process (the processing procedure of step S860 illustrated in FIG. 14) within the processing procedure of the wireless resource reusing process of the information processing apparatus 100 according to the first embodiment of the present technology.

First, the control unit 150 measures the reception strength (reception strength (QD) of a desired signal) of a received RTS frame (step S861).

Subsequently, the control unit 150 compares the measured reception strength (QD) with the measured RTS frame reception strength (QR) and the measured CTS frame reception strength (QC) (step S862). As described above, the measured RTS frame reception strength (QR) and the measured CTS frame reception strength (QC) are stored in the memory 160.

Specifically, the control unit 150 determines whether Expression 2 described above is satisfied. When Expression 2 is satisfied (step S862), the control unit 150 transmits a CTS frame to the information processing apparatus that has transmitted the RTS frame (step S863).

Moreover, when Expression 2 is not satisfied (step S862), the control unit 150 performs standby until the ending time of the cleared NAV (step S865) without transmitting the CTS frame (step S864).

Here, the information processing apparatus that has transmitted the RTS frame to the information processing apparatus 100 transmits data frames only when it was possible to receive the CTS frame after the elapse of a predetermined period. On the other hand, the information processing apparatus that has transmitted the RTS frame to the information processing apparatus 100 determines that sufficient quality is not satisfied when it was not possible to receive the CTS frame after the elapse of a predetermined period. Moreover, the information processing apparatus performs standby until the ending time of the cleared NAV without retransmitting the RTS frame or transmitting data.

In this way, the wireless resource reusing apparatus (for example, the information processing apparatus 100 and the information processing apparatus 101) ends a series of frame exchanges relating to transmission and reception of data frames. Alternatively, when the ending time of the cleared NAV expires, the wireless resource reusing apparatus restores the physical carrier sense detection threshold to an original value.

Here, when it is not possible to receive an ACK frame after transmission of data frames or when there is time to retransmit data frames until the ending time of the cleared NAV, data frames may be retransmitted. However, when the ending time of NAV has expired, no further retransmission is performed and frame exchange ends at that point in time.

Figure 17:
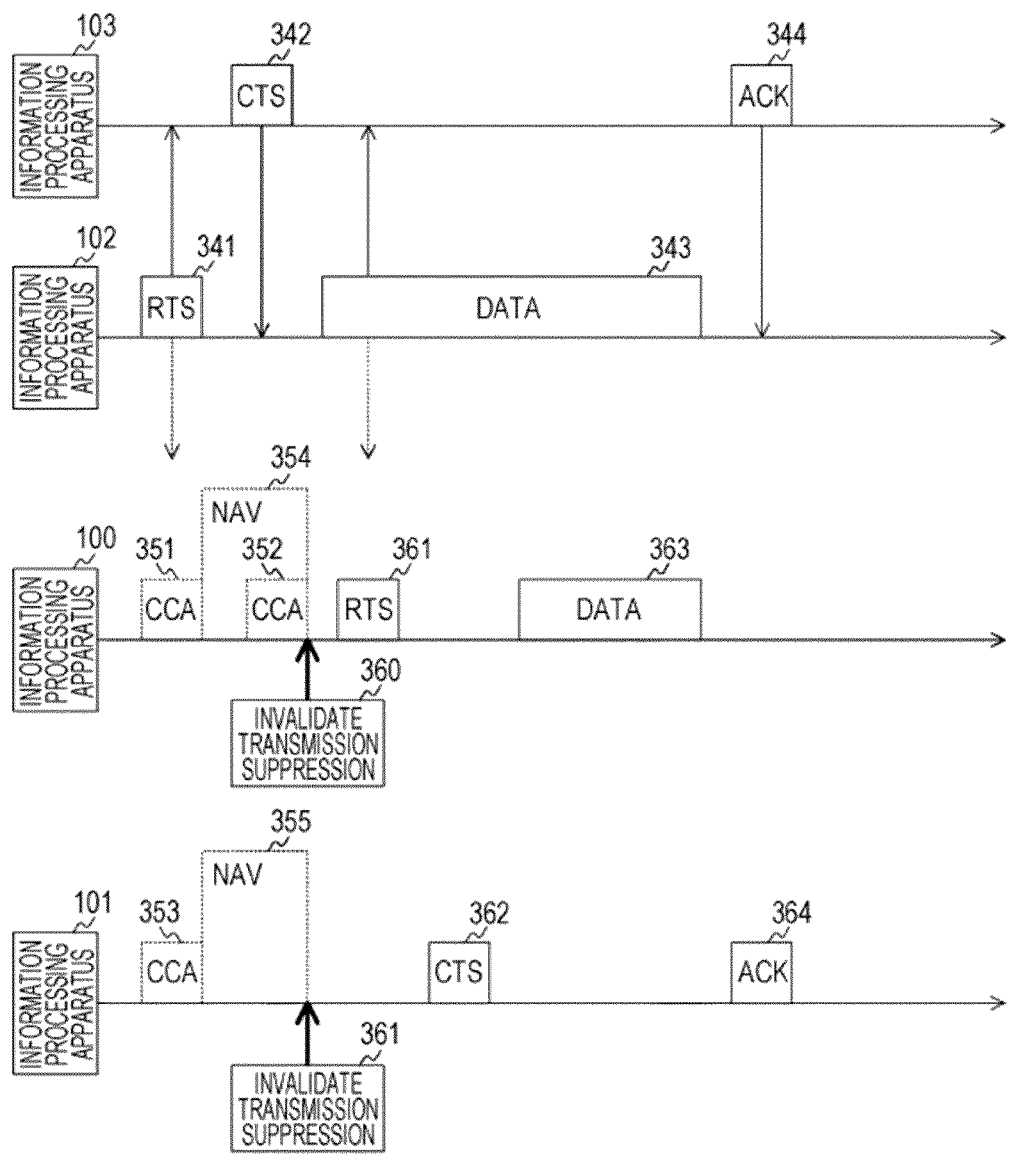
FIG. 17 is a diagram illustrating, in a time-series manner, an example of a packet transmission/reception process and a transmission suppression invalidating process between information processing apparatuses that form the communication system 10 according to the first embodiment of the present technology.

Example of Packet Transmission/Reception Process and Transmission Suppression Invalidating Process FIG. 17 is a diagram illustrating, in a time-series manner, an example of a packet transmission/reception process and a transmission suppression invalidating process between respective information processing apparatuses that form the communication system 10 according to the first embodiment of the present technology. The horizontal axis illustrated in FIG. 17 represents a time axis.

Symbols CCA and NAV illustrated in FIG. 17 are the same as those of FIGS. 6A and 6B. Moreover, FIG. 17 illustrates an example of using wireless resources in a simplified manner when wireless resources are reused using the above-described mechanism.

As illustrated in FIG. 17, a case where the information processing apparatus 102 obtains a transmission right first and starts transmitting data to the information processing apparatus 103 will be considered. In this case, a series of frames (the RTS frame (341), the CTS frame (342), the data frame (343), and the ACK frame (344)) are exchanged between the information processing apparatus 102 and the information processing apparatus 103.

Due to this, transmission of the information processing apparatus 100 and the information processing apparatus 101 is suppressed (351 to 355). However, with the transmission suppression invalidating process (360 and 361), the information processing apparatus 100 can performs a transmission process (361 to 364) when a series of frame exchanges (341 to 344) is performed between the information processing apparatus 102 and the information processing apparatus 103.

In this manner, wireless resources can be reused by performing the transmission suppression invalidating process (360 and 361). Due to this, the information processing apparatus 100 and the information processing apparatus 101 can perform data communication without having influence on the communication of the NAV-cleared apparatus (the information processing apparatus 102 and the information processing apparatus 103). In this case, by checking the transmission quality of the subject apparatus, it is possible to suppress unnecessary interferences as much as possible and to improve resource utilization efficiency.

In this manner, the control unit 150 clears transmission suppression when a communication quality (for example, a reception strength) of a first frame (RTS frame) and information on whether the first frame is received and a communication quality of a second frame (CTS frame) and information on whether the second frame is received satisfy a predetermined condition. For example, the control unit 150 compares the communication quality of at least one of the first frame and the second frame in the information processing apparatus 100 with the communication quality between a source information processing apparatus of the first frame and the destination information processing apparatus of the first frame. The control unit 150 determines whether the predetermined condition is satisfied based on the comparison result. In this case, when it was not possible to receive either the first frame or the second frame, the control unit 150 may use a carrier sense detection threshold instead of the communication quality of the first frame or the second frame which was not received.

Moreover, the control unit 150 clears the transmission suppression for a predetermined period from the reception timing of the second frame. Moreover, the control unit 150 performs control of changing the carrier sense detection threshold together with clearing the transmission suppression. For example, the control unit 150 may set such a value that it is not possible to detect the higher communication quality among the communication quality of the first frame and the communication quality of the second frame as the carrier sense detection threshold. Moreover, for example, the control unit 150 changes the carrier sense detection threshold until the NAV ending timing specified by the first frame or the second frame.

Moreover, when data that is to be transmitted to another information processing apparatus is present in the memory 160, the control unit 150 starts transmitting the data after the elapse of a standby period defined by a predetermined procedure from clearing of transmission suppression.

Moreover, when data that is to be transmitted to another information processing apparatus is present in the memory 160, the control unit 150 estimates whether the data to be transmitted to the other information processing apparatus will be received with predetermined communication quality in the other information processing apparatus. For example, the control unit 150 may perform the estimation based on the result of comparison between the communication quality in the past communication with the other information processing apparatus and the higher one of the communication quality of the first frame and the communication quality of the second frame. The control unit 150 determines whether the data during clearing of transmission suppression will be transmitted based on the estimation result.

Moreover, when a RTS frame addressed to the information processing apparatus 100 is received during clearing of transmission suppression, the control unit 150 compares the communication quality of the RTS frame with the higher one of the communication quality of the first frame and the communication quality of the second frame. The control unit 150 determines whether a CTS frame will be transmitted as a response to the RTS frame based on the comparison result.

In this manner, the respective information processing apparatuses that form the communication system 10 determines reusability of wireless resources based on the reception state of the received RTS/CTS from a third party and preliminary information. Only when it is determined that wireless resources can be reused, transmission suppression is invalidated and a frame exchange process is performed using wireless resources.

The link quality information may be notified to a portion or all of the information processing apparatuses. In this case, in order to give an equal chance for reusing wireless resources, an information processing apparatus having a transmission suppression clearing function may notify the link quality information of a connection destination of the subject apparatus at all times.

Moreover, the information processing apparatus having the transmission suppression clearing function may start transmission of the subject apparatus at all times according to the RTS/CTS procedure regardless of whether wireless resources are reused.

2. Second Embodiment

In the first embodiment of the present technology, an example in which the respective information processing apparatuses notify link quality information has been illustrated. Here, for example, when RTS/CTS frames are exchanged between respective information processing apparatuses, link quality information may be included in the RTS/CTS frames so that the link quality information is transmitted to other information processing apparatuses. In this case, notification of link quality information may be unnecessary.

Thus, in the second embodiment of the present technology, an example in which the format of RTS/CTS frames is changed and the link quality information is transmitted in a state of being included in the RTS/CTS frames is illustrated.

The configuration of the information processing apparatus according to the second embodiment of the present technology is approximately the same as that of the information processing apparatuses 100 to 103 illustrated in FIG. 1 and the like. Due to this, the same portions as those of the first embodiment of the present technology will be denoted by the same reference numerals as those of the first embodiment of the present technology, and description of some of these portions will not be provided.

Format Example of RTS/CTS Frame

Figure 18A:
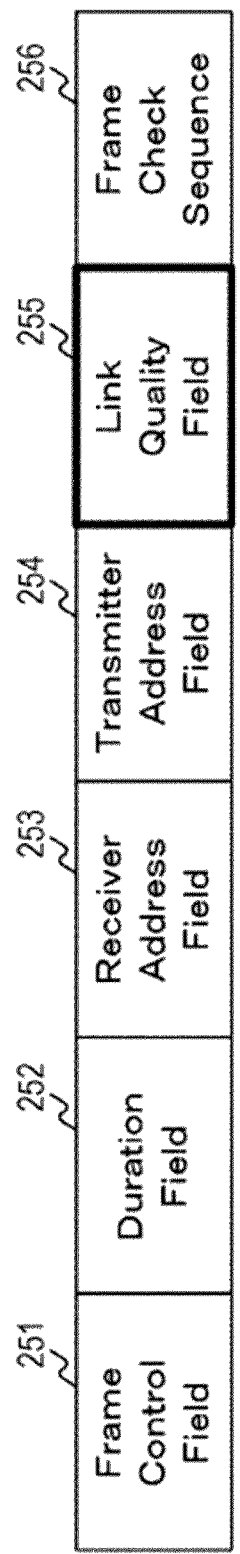
FIGS. 18A and 18B are diagrams illustrating a format example of RTS/CTS frames exchanged between information processing apparatuses that form a communication system 10 according to a second embodiment of the present technology.
Figure 18B:
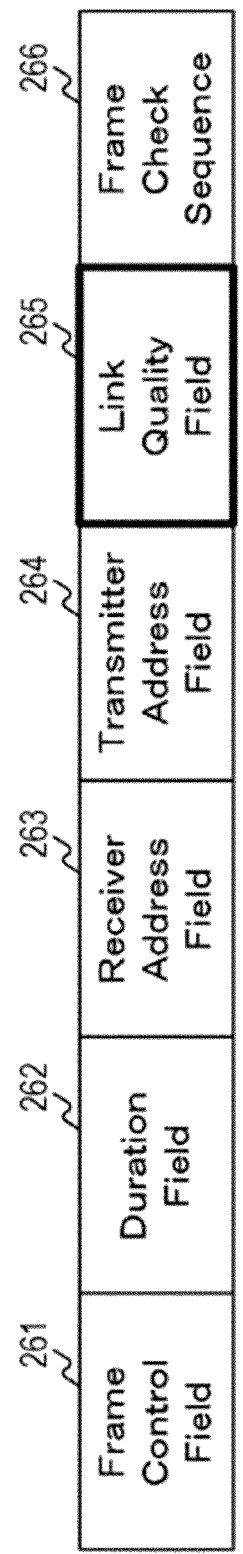

FIGS. 18A and 18B are diagrams illustrating a format example of RTS/CTS frames exchanged between respective information processing apparatuses that form the communication system 10 according to the second embodiment of the present technology.

In FIGS. 18A and 18B, an example where a RTS frame and a CTS frame have different formats from those of the IEEE 802.11 wireless LAN standard illustrated in FIGS. 6A and 6B is illustrated. FIG. 18A illustrates a format example of a RTS frame and FIG. 18B illustrates a format example of a CTS frame. Among the plurality of fields illustrated in FIGS. 18A and 18B, since fields having the same names as those of the fields illustrated in FIGS. 6A and 6B correspond to the fields illustrated in FIGS. 6A and 6B, description thereof will not be provided here.

As illustrated in FIG. 18A, in the RTS frame format, a Link Quality Field 255 is added. The Link Quality Field 255 is a field in which the link quality information of a destination information processing apparatus is stored. A source information processing apparatus of the RTS frame stores information on the reception strength in the past communication with the destination information processing apparatus in the Link Quality Field 255. When the information on the reception strength in the past communication from the destination information processing apparatus is not present, the lowest value that can be taken may be stored in the Link Quality Field 255.

As illustrated in FIG. 18B, in the CTS frame format, a Link Quality Field 265 is added. The Link Quality Field 265 is a field in which the link quality information of a destination information processing apparatus is stored. A source information processing apparatus of the CTS frame stores information on the reception strength of the RTS frame (a RTS frame corresponding to the CTS frame) transmitted prior to the CTS frame in the Link Quality Field 265.

The information on the reception strength may be quantized to a certain granularity and be stored in a RTS/CTS frame.

Example of Wireless Resource Reusing Process

Figure 19:
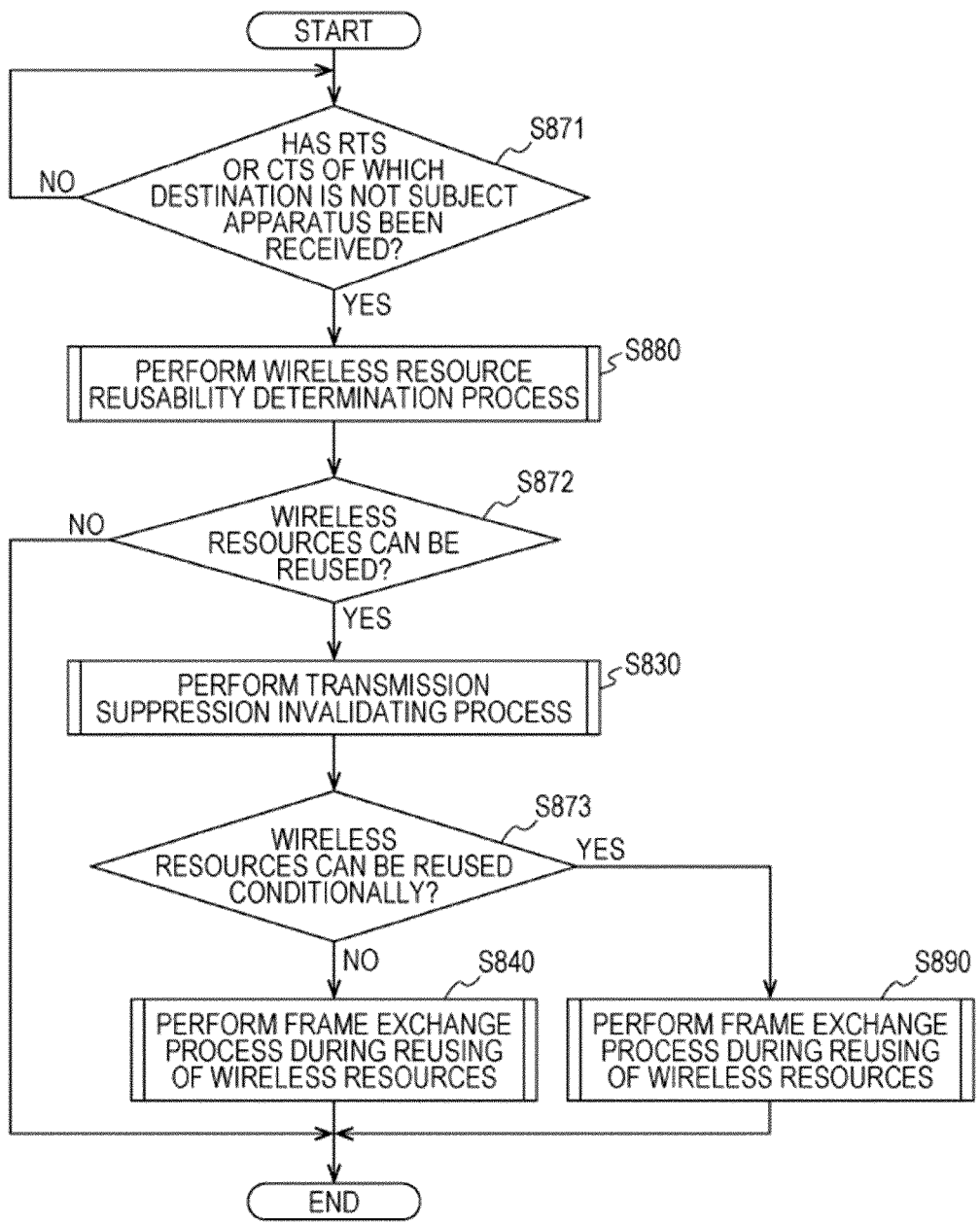
FIG. 19 is a flowchart illustrating an example of a processing procedure of a wireless resource reusing process of an information processing apparatus 100 according to the second embodiment of the present technology.

FIG. 19 is a flowchart illustrating an example of a processing procedure of a wireless resource reusing process of the information processing apparatus 100 according to the second embodiment of the present technology. Since the processing procedure illustrated in FIG. 19 modifies a portion of the processing procedure illustrated in FIG. 10, the same portions as those of FIG. 10 will be denoted by the same reference numerals, and description of some of these portions will not be provided.

First, the control unit 150 determines whether a RTS frame of which the destination is not a subject apparatus or a CTS frame of which the destination is not a subject apparatus has been received (step S871). When either the RTS frame of which the destination is not the subject apparatus or the CTS frame of which the destination is not the subject apparatus has not been received (step S871), the control unit 150 continues monitoring. In this manner, in the second embodiment of the present technology, even when the RTS frame is not received and the CTS frame only has been received, it is possible to reuse wireless resources.

When the RTS frame of which the destination is not the subject apparatus or the CTS frame of which the destination is not the subject apparatus has been received (step S871), a wireless resource reusability determination process is performed (step S880). The wireless resource reusability determination process will be described in detail with reference to FIG. 20. Moreover, the RTS frame of which the destination is not the subject apparatus or the CTS frame of which the destination is not the subject apparatus has been received (step S871), the control unit 150 sets NAV.

Subsequently, the control unit 150 performs a wireless resource reusability determination process to determine whether wireless resources can be reused (step S872). When it is determined that it is not possible to reuse wireless resources (step S872), the control unit 150 ends the operation of the wireless resource reusing process.

When it is determined that wireless resources can be reused (step S872), a transmission suppression invalidating process is performed (step S830).

Subsequently, the control unit 150 determines whether the result of the wireless resource reusability determination process shows that wireless resources can be reused conditionally (step S873). When it is determined that wireless resources can be reused (step S873), a frame exchange process during reusing of wireless resources is performed (step S840).

Moreover, when it is determined that wireless resources can be reused conditionally (step S873), a frame exchange process during reusing of wireless resources is performed (step S890). The frame exchange process during reusing of wireless resources will be described in detail with reference to FIG. 21.

Example of Wireless Resource Reusability Determination Process

Figure 20:
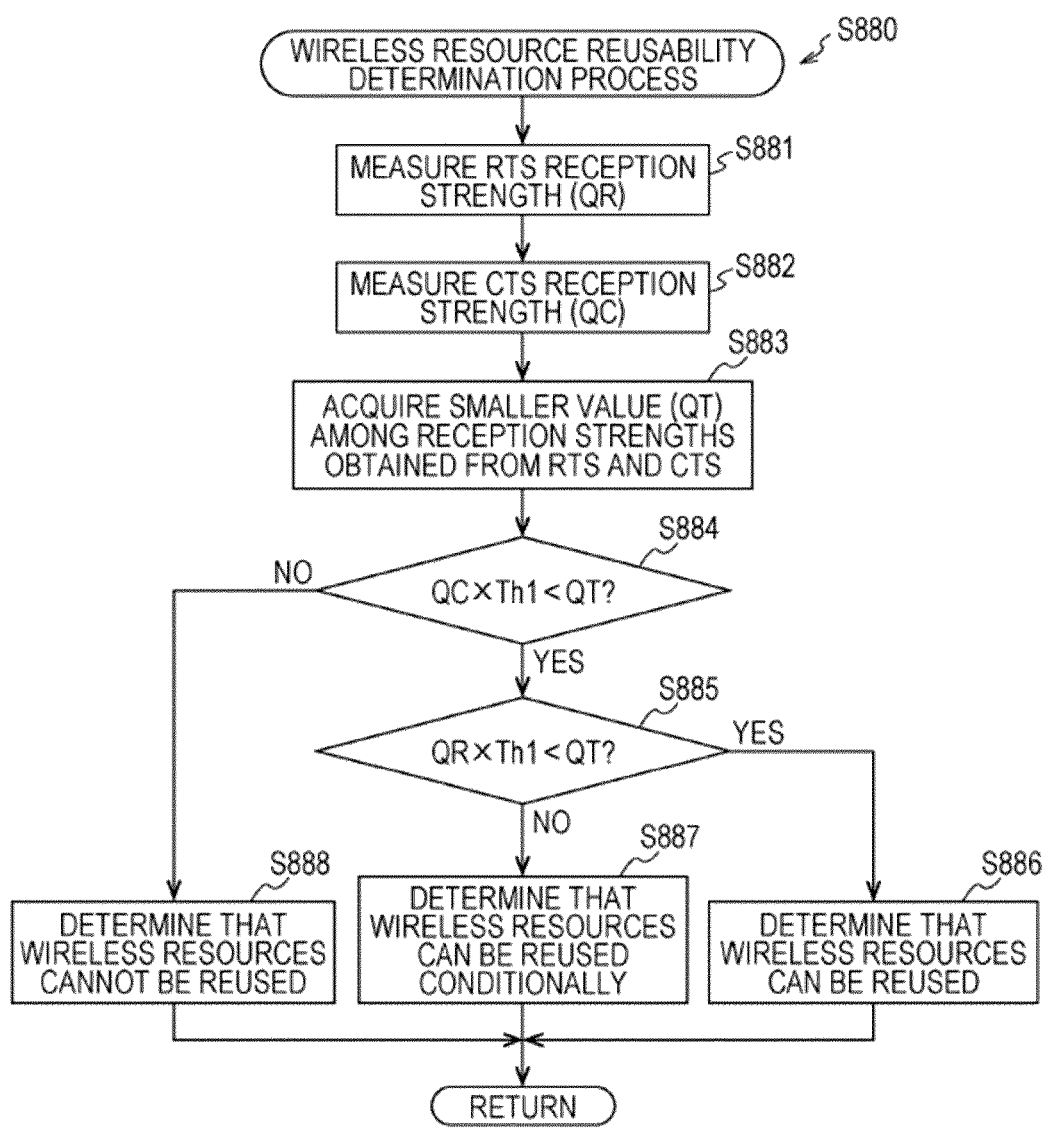
FIG. 20 is a flowchart illustrating a wireless resource reusability determination process (a processing procedure of step S880 illustrated in FIG. 19) within the processing procedure of the wireless resource reusing process of the information processing apparatus 100 according to the second embodiment of the present technology.

FIG. 20 is a flowchart illustrating a wireless resource reusability determination process within the processing procedure of the wireless resource reusing process of the information processing apparatus 100 according to the second embodiment of the present technology. The wireless resource reusability determination process corresponds to a processing procedure of step S880 illustrated in FIG. 19.

The processing procedure illustrated in FIG. 20 modifies a portion of the processing procedure illustrated in FIG. 11 and has two main differences from the processing procedure illustrated in FIG. 11, which are the QT used and the determination condition. Due to this, description of some of the same portions as those of FIG. 11 will not be provided. Moreover, the wireless resource reusability determination process is executed by an information processing apparatus (wireless resource reusing apparatus) in which a transmission request occurs in a state where NAV is set, for example.

The control unit 150 measures the reception strength (QR) of the RTS frame (step S881) and measures the reception strength (QC) of a CTS frame transmitted after the elapse of a predetermined period from reception of the RTS frame (step S882). These processes (steps S881 and S882) correspond to steps S821 and S822 illustrated in FIG. 11.

Subsequently, the control unit 150 acquires information (QT) on the reception strength stored in the Link Quality Fields 255 and 265 (illustrated in FIGS. 18A and 18B) provided in the received RTS frame or CTS frame. Here, a case where both the RTS frame and the CTS frame are received and different values are stored in the Link Quality Fields 255 and 265 may happen. In this case, the smaller one of the values stored in the Link Quality Fields 255 and 265 may be used as QT.

In this manner, in FIG. 20, the information used as QT is different from that of FIG. 11. That is, in FIG. 11, information on the reception strength included in the notified link quality information (the link quality information between NAV-cleared apparatuses) is used as QT. In contrast, in FIG. 20, information on the reception strength stored in the RTS frame or the CTS frame (the Link Quality Fields 255 and 265 (illustrated in FIGS. 18A and 18B)) is used as QT.

Subsequently, the control unit 150 compares the acquired reception strength (QT) with the measured CTS frame reception strength (QC) (step S884). The measured CTS frame reception strength (QC) is stored in the memory 160.

Specifically, the control unit 150 determines whether Expression 3 below is satisfied.

$$QC \times Th1 < QT \qquad \text{Expression 3}$$

When Expression 3 is not satisfied (step S884), the control unit 150 determines that it is not possible to reuse wireless resources (step S888) and ends the operation of the wireless resource reusability determination process.

Moreover, when Expression 3 is satisfied (step S884), the control unit 150 compares the acquired reception strength (QT) with the measured RTS frame reception strength (QR) (step S885). The measured RTS frame reception strength (QR) is stored in the memory 160.

Specifically, the control unit 150 determines whether Expression 4 below is satisfied.

$$QR \times Th1 < QT \qquad \text{Expression 4}$$

The threshold Th1 may have the same value as the threshold Th1 illustrated in FIG. 11. Moreover, the threshold Th1 may have a different value from the threshold Th1 illustrated in FIG. 11.

When Expression 4 is not satisfied (step S885), the control unit 150 determines that wireless resources can be reused conditionally (step S887) and ends the operation of the wireless resource reusability determination process. Here, the condition for determining that wireless resources can be reused conditionally is a condition for guaranteeing that transmissions in a specific direction do not overlap since it is difficult to secure sufficient communication quality for simultaneous transmission depending on the direction of transmitting packets between NAV-cleared apparatuses, for example.

Moreover, when Expression 4 is satisfied (step S885), the control unit 150 determines that wireless resources can be reused (step S886) and ends the operation of the wireless resource reusability determination process.

As described above, the determination condition in FIG. 20 is different from that of FIG. 11. That is, in FIG. 11, it is determined that wireless resources can be reused only when both the measured RTS frame reception strength (QR) and the measured CTS frame reception strength (QC) are sufficiently smaller than QT based on Expression 1. In contrast, in FIG. 20, it is determined that wireless resources can be reused conditionally even when only the measured CTS frame reception strength (QC) is sufficiently smaller than QT. Moreover, in FIG. 20, it is determined that wireless resources can be reused even when both the measured RTS frame reception strength (QR) and the measured CTS frame reception strength (QC) are sufficiently smaller than QT similarly to FIG. 11.

Next, the frame exchange process during reusing of wireless resources (step S890) illustrated in FIG. 19 will be described. The frame exchange process during reusing of wireless resources (step S890) modifies a portion of the frame exchange process during reusing of wireless resources (step S840) illustrated in FIG. 14. Specifically, only the transmitter-side process (step S850) within the frame exchange process during reusing of wireless resources (step S890) illustrated in FIG. 14 is different. Thus, in the following description, only the different portion (the transmitter-side process (step S891)) within the frame exchange process during reusing of wireless resources (step S890) illustrated in FIG. 14 will be described.

Example of Wireless Resource Reusability Determination Process

Figure 21:
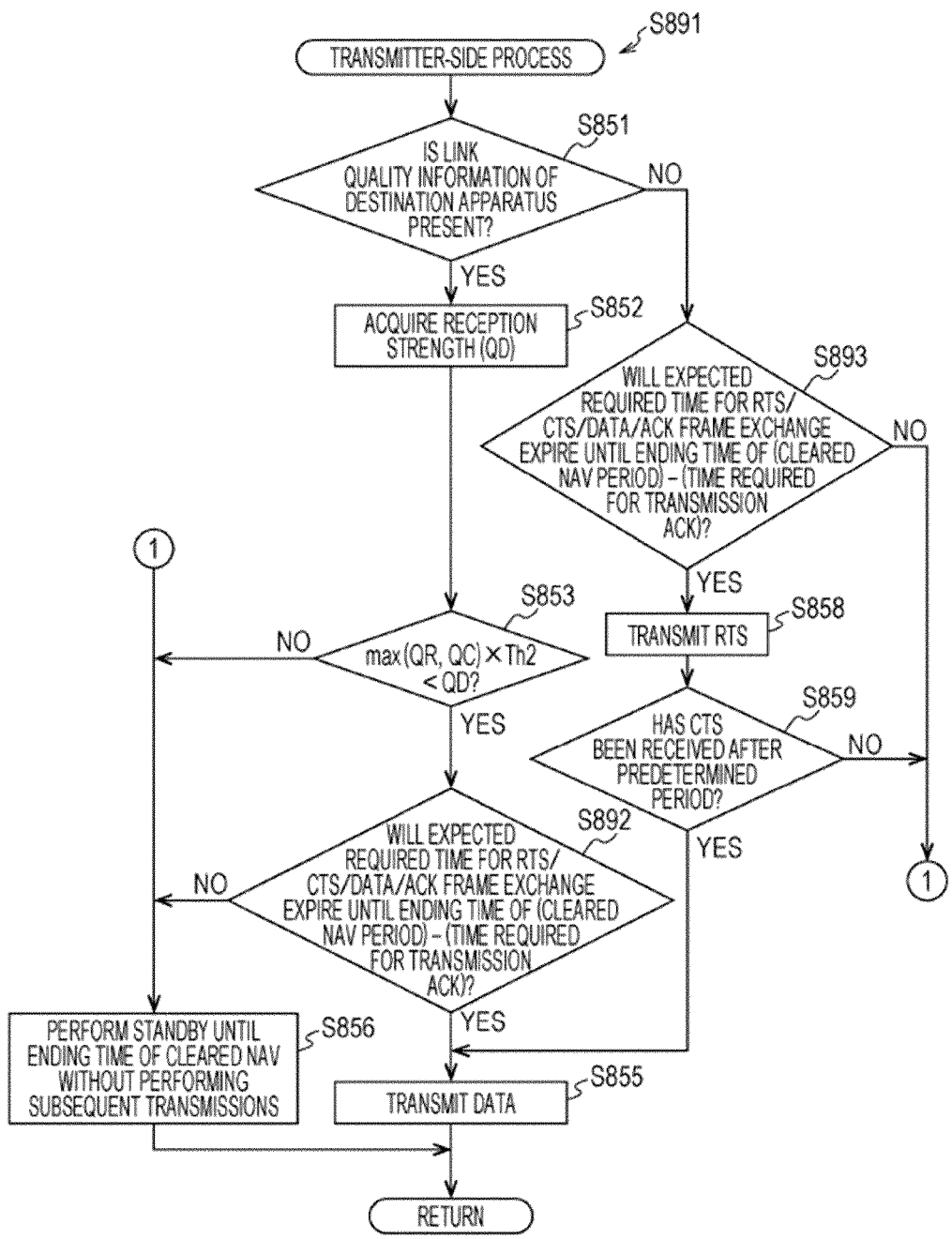
FIG. 21 is a flowchart illustrating a frame exchange process during reusing of wireless resources within the processing procedure of the wireless resource reusing process of the information processing apparatus 100 according to the second embodiment of the present technology.

FIG. 21 is a flowchart illustrating a frame exchange process during reusing of wireless resources within the processing procedure of the wireless resource reusing process of the information processing apparatus 100 according to the second embodiment of the present technology.

The processing procedure illustrated in FIG. 21 modifies a portion of the processing procedure illustrated in FIG. 15 and is different from the processing procedure illustrated in FIG. 15 only in terms of the frame exchange determination process (steps S892 and S893). Due to this, the same portions as those of FIG. 15 will be denoted by the same reference numerals as FIG. 15, and description of some of the same portions will not be provided.

When Expression 2 is satisfied (step S853), the control unit 150 calculates the time necessary for frame exchange necessary for transmission of the data. Moreover, the control unit 150 determines whether the frame exchange will be completed until the estimated ending time of [(the cleared NAV period)−(time necessary for ACK transmission)] (step S892).

Here, the time necessary for ACK transmission is calculated by assuming that the ACK frame is transmitted with the lowest transmission rate. Moreover, in addition to the time necessary for ACK transmission, a predetermined interframe interval may also be subtracted.

When it is determined that frame exchange will be completed until the estimated ending time of [(cleared NAV period)−(time necessary for ACK transmission)] (step S892), the flow proceeds to step S855. On the other hand, when it is determined that frame exchange will not be completed until the estimated ending time of [(cleared NAV period)−(time necessary for ACK transmission)] (step S892), the flow proceeds to step S856.

Moreover, when the link quality information of the destination apparatus is not present in the memory 160 (step S851), the control unit 150 calculates the time necessary for frame exchange necessary for transmission of the data. The control unit 150 determines whether the frame exchange will be completed until the estimated ending time of [(the cleared NAV period)−(time necessary for ACK transmission)] (step S893).

When it is determined that frame exchange will be completed until the estimated ending time of [(cleared NAV period)−(time necessary for ACK transmission)] (step S893), the flow proceeds to step S858. On the other hand, when it is determined that frame exchange will not be completed until the estimated ending time of [(cleared NAV period)−(time necessary for ACK transmission)] (step S893), the flow proceeds to step S856.

Here, when it is determined that wireless resources can be reused conditionally, it may not be possible for the reception in an information processing apparatus that has transmitted the RTS frame among the NAV-cleared apparatuses to secure sufficient communication quality due to simultaneous transmission. Due to this, transmission needs to avoid the period in which the NAV-cleared apparatus receives ACK. Thus, in FIG. 21, it is determined whether frame exchange of the subject apparatus will end until the time subtracted by the time necessary for transmission of ACK from the ending time of NAV.

In this manner, the control unit 150 changes the carrier sense detection threshold until the time subtracted by the time necessary for transmitting the ACK frame from the NAV ending time specified by the first frame or the second frame. Moreover, the control unit 150 calculates the time necessary for frame exchange of the data to be transmitted to the other information processing apparatus and determines whether reception of the ACK frame can be completed within the time necessary for changing the carrier sense detection threshold. When it is determined that it is difficult to complete the reception of the ACK frame within the time necessary for changing the carrier sense detection threshold, the control unit 150 does not transmit data during clearing of transmission suppression and performs standby until the NAV ending time. During the standby period, the control unit 150 regards the wireless channel state as being busy.

3. Third Embodiment

In the first embodiment of the present technology, an example in which respective information processing apparatuses notify link quality information has been illustrated. Moreover, in the second embodiment of the present technology, an example in which link quality information is transmitted in a state of being included in the RTS/CTS frame has been illustrated. Here, for example, by changing the transmission suppression clearing condition, wireless resources may be reused without notifying the link quality information or changing the format of the RTS/CTS frame.

Thus, in a third embodiment of the present technology, an example in which a transmission suppression clearing condition is changed to reuse wireless resources is illustrated. The configuration of the information processing apparatus according to the third embodiment of the present technology is approximately the same as that of the information processing apparatuses 100 to 103 illustrated in FIG. 1 and the like. Due to this, the same portions as those of the first embodiment of the present technology will be denoted by the same reference numerals as those of the first embodiment of the present technology, and description of some of these portions will not be provided.

Example of Wireless Resource Reusability Determination Process

Figure 22:
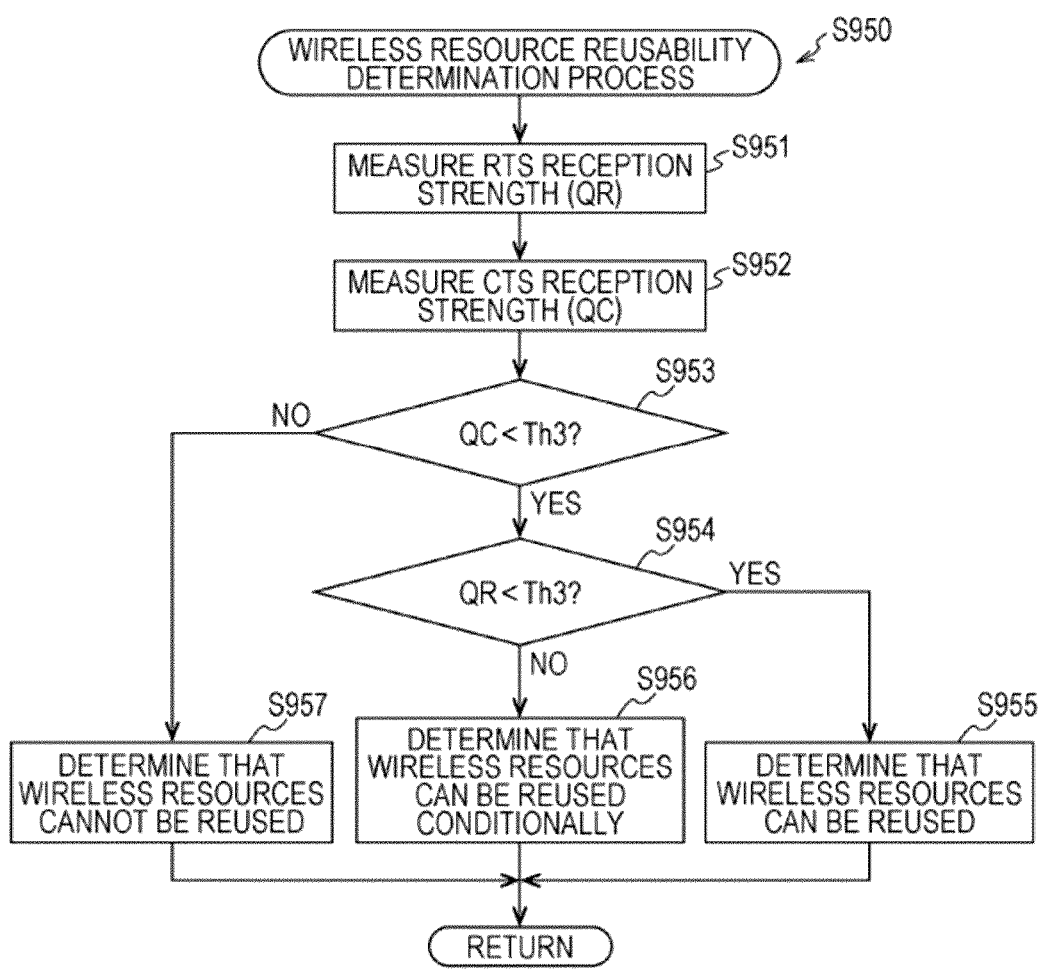
FIG. 22 is a flowchart illustrating a wireless resource reusability determination process within a processing procedure of a wireless resource reusing process of an information processing apparatus 100 according to a third embodiment of the present technology.

FIG. 22 is a flowchart illustrating a wireless resource reusability determination process within the processing procedure of the wireless resource reusing process of the information processing apparatus 100 according to the third embodiment of the present technology.

The processing procedure illustrated in FIG. 22 modifies a portion of the processing procedure illustrated in FIG. 20.

Due to this, description of some of the same portions as those of FIG. 20 will not be provided.

The control unit 150 measures the reception strength (QR) of the RTS frame (step S951) and measures the reception strength (QC) of a CTS frame transmitted after the elapse of a predetermined period from reception of the RTS frame (step S952). These processes (steps S951 and S952) correspond to steps S881 and S882 (steps S821 and S822 illustrated in FIG. 11) illustrated in FIG. 20.

Subsequently, the control unit 150 compares the measured CTS frame reception strength (QC) with a threshold Th3 (step S953). The measured CTS frame reception strength (QC) is stored in the memory 160.

Specifically, the control unit 150 determines whether Expression 5 below is satisfied.

$$QC<Th3 \quad \text{Expression 5}$$

Here, the threshold Th3 is a threshold for determining whether attenuation between the subject apparatus and the information processing apparatus that has set NAV is sufficiently large. For example, such a reception level ratio that it is expected that transmission of a wireless resource reusing apparatus does not have large influence on reception in the information processing apparatus that has set NAV is set. Specifically, the threshold Th3 can be set to a value of approximately 10 dB to 30 dB, for example.

When Expression 5 is not satisfied (step S953), the control unit 150 determines that it is difficult to reuse wireless resources (step S957) and ends the operation of the wireless resource reusability determination process.

Moreover, when Expression 5 is satisfied (step S953), the control unit 150 compares the measured RTS frame reception strength (QR) with the threshold Th3 (step S954). The measured RTS frame reception strength (QR) is stored in the memory 160.

Specifically, the control unit 150 determines whether Expression 6 below is satisfied.

$$QR<Th3 \quad \text{Expression 6}$$

When Expression 6 is not satisfied (step S954), the control unit 150 determines that wireless resources can be reused conditionally (step S956) and ends the operation of the wireless resource reusability determination process.

Moreover, when Expression 6 is satisfied (step S954), the control unit 150 determines that wireless resources can be reused (step S955) and ends the operation of the wireless resource reusability determination process.

In this manner, in FIG. 22, the wireless resource reusing apparatus determines reusability based on only the RTS frame reception strength (QR) and the CTS frame reception strength (QC) of the frames that have set NAV to the subject apparatus.

Since the transmission suppression invalidating process is the same as that of the first embodiment of the present technology, description thereof will not be provided here. Moreover, since the frame exchange process during reusing of wireless resources is the same as that of the second embodiment of the present technology, description thereof will not be provided here.

As described above, the control unit 150 can determine that the predetermined condition is satisfied when a first frame or a second frame can be received and the communication quality of the received first frame or second frame is smaller than a threshold.

Application Example Other than RTS/CTS

In the first to third embodiments of the present technology, an example in which transmission suppression of a wireless resource reusing apparatus based on virtual carrier sense occurs upon receiving a RTS frame or a CTS frame from a NAV-cleared apparatus has been illustrated.

However, a frame that causes virtual carrier sense-based transmission suppression to occur over a plurality of frames after the frame is received is not limited to the RTS frame or the CTS frame.

In this example, an enhanced distributed channel access (EDCA) defined in the IEEE 802.11 standard will be described as an example. With EDCA, upon acquisition of a single transmission right, it is permitted to continuously transmit frames a plurality of number of times. A period in which frames can be transmitted a plurality of number of times is called transmission opportunity (TXOP) and the upper limit of the duration of TXOP is called TXOP Limit. Moreover, in an information processing apparatus which does not use the RTS/CTS procedure, when TXOP Limit is not 0, a plurality of transmissions of frames may occur.

In such a case, in the first transmission frame, NAV that includes an expected transmission period of the subsequent frames is set. An example of transmission suppression for such a case is illustrated in FIG. 23.

Figure 23:
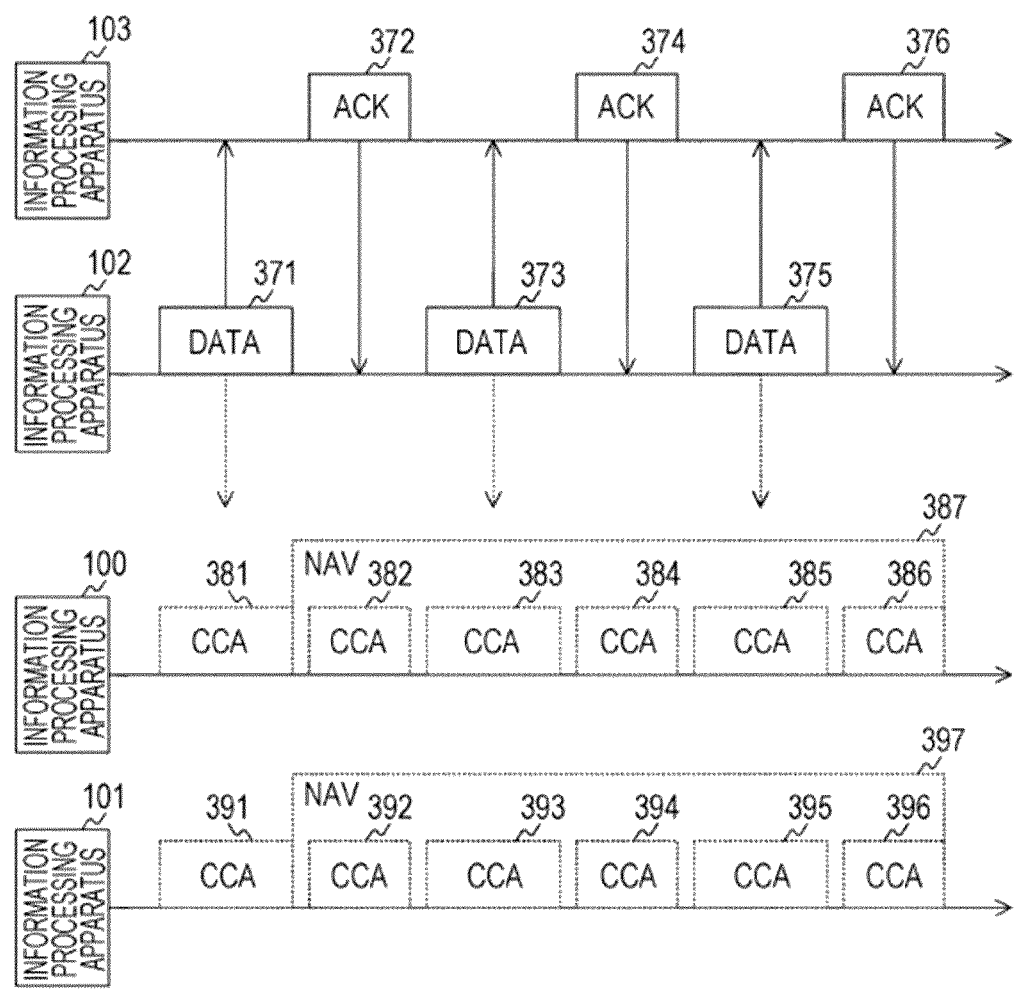
FIG. 23 is a diagram illustrating, in a time-series manner, an example of a packet transmission/reception process and a transmission suppression process between respective information processing apparatuses that form the communication system 10 according to the embodiment of the present technology.

Example of Packet Transmission/Reception Process and Transmission Suppression Process FIG. 23 is a diagram illustrating, in a time-series manner, an example of a packet transmission/reception process and a transmission suppression process between respective information processing apparatuses that form the communication system 10 according to the embodiment of the present technology. The horizontal axis illustrated in FIG. 23 represents a time axis.

The symbols CCA (dotted rectangles 381 to 386 and 391 to 396) and NAV (387 and 397) illustrated in FIG. 23 are the same as those of FIGS. 6A and 6B.

As illustrated in FIG. 23, the information processing apparatus 102 and the information processing apparatus 103 do not transmit a RTS/CTS frame. However, a data frame 371 transmitted first and the subsequent Ack frame 372 correspond to the RTS/CTS frame in the first to third embodiments of the present technology. Due to this, similarly to the first to third embodiments of the present technology, virtual carrier sense-based transmission suppression occurs in the information processing apparatus 100 and the information processing apparatus 101.

In the fourth to sixth embodiments of the present technology described later, the Data frame may be a QoS Data frame in the IEEE 802.11 standard and a plurality of data frames may be connected. Moreover, the Ack frame may be a Block Ack frame in the IEEE 802.11 standard.

Moreover, in the fourth to sixth embodiments of the present technology, the thresholds used in the respective determination processes may be the same as the thresholds used in the first to third embodiments of the present technology.

4. Fourth Embodiment

In the fourth embodiment of the present technology, an example corresponding to the first embodiment of the present technology is illustrated. That is, in the fourth embodiment of the present technology, an example in which the same topology and transmission conditions as those of the first embodiment of the present technology are used but the RTS/CTS procedure is not used in the communication between the information processing apparatus 102 and the information processing apparatus 103 is illustrated. In other words, a case where a plurality of EDCA-based frame exchanges is used will be considered and an example in which the information processing apparatus 100 and the information processing apparatus 101 reuse wireless resources is illustrated. It is assumed that the information processing apparatus 100 and the information processing apparatus 101 do not use the RTS/CTS procedure but use a plurality of EDCA-based frame exchanges.

The configuration of the information processing apparatus according to the fourth embodiment of the present technology is approximately the same as that of the information processing apparatuses 100 to 103 illustrated in FIG. 1 and the like. Due to this, the same portions as those of the first embodiment of the present technology will be denoted by the same reference numerals as those of the first embodiment of the present technology, and description of some of these portions will not be provided.

Notification of link quality information can be performed according to the same process as that of the first embodiment of the present technology, and description thereof will not be provided here.

Here, a case where after such preprocessing is performed, communication between the information processing apparatus 102 and the information processing apparatus 103 using a plurality of EDCA-based frame exchanges occurs will be considered. In this case, transmission suppression is set to the information processing apparatus 100 and the information processing apparatus 101 according to the data frame (a data frame of which the destination is not the subject apparatus) transmitted from the information processing apparatus 102. Thus, in the fourth embodiment of the present technology, an example in which transmission and reception requests occur between the information processing apparatus 100 and the information processing apparatus 101 in such a state, and wireless resources are reused according to a situation will be described.

Example of Wireless Resource Reusing Process

Figure 24:
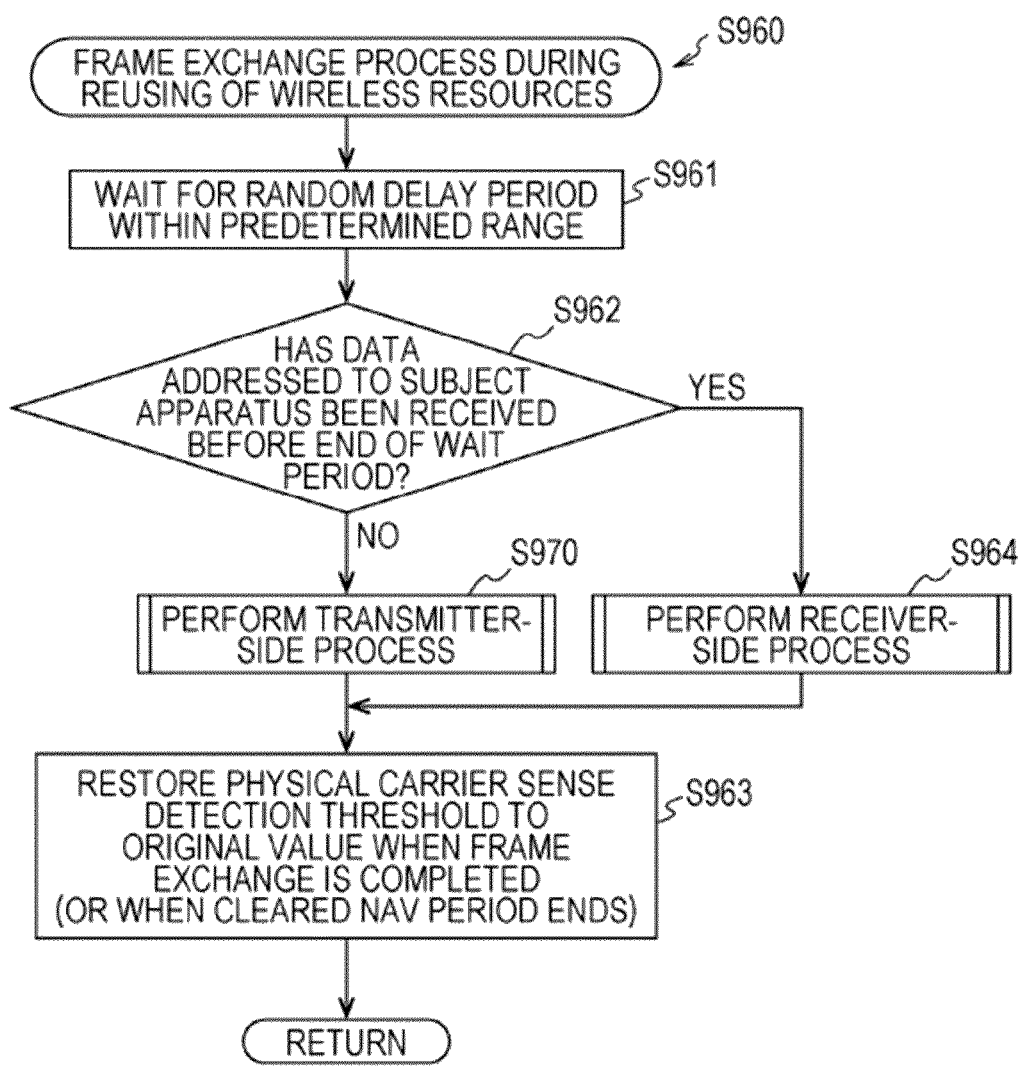
FIG. 24 is a flowchart illustrating a frame exchange process during reusing of wireless resources within a processing procedure of a wireless resource reusing process of an information processing apparatus 100 according to a fourth embodiment of the present technology.

A processing procedure of a wireless resource reusing process of the information processing apparatus 100 according to the fourth embodiment of the present technology modifies a portion of the processing procedure illustrated in FIG. 10. Specifically, within the processing procedure illustrated in FIG. 10, "RTS (RTS frame)" is replaced with "Data (Data frame) (or QoS Data frame)". Moreover, the frame exchange process during reusing of wireless resources (step S960) illustrated in FIG. 24 is performed instead of the frame exchange process during reusing of wireless resources (step S840) illustrated in FIG. 10.

That is, the respective information processing apparatuses that form the communication system 10 determines reusability of wireless resources based on the reception state of the received Data/Ack from a third party and preliminary information. Only when it is determined that wireless resources can be reused, transmission suppression is invalidated and a frame exchange process is performed reusing wireless resources.

Example of Wireless Resource Reusability Determination Process

A processing procedure of a wireless resource reusability determination process of the information processing apparatus 100 according to the fourth embodiment of the present technology modifies a portion of the processing procedure illustrated in FIG. 11. Specifically, within the processing procedure illustrated in FIG. 11, "RTS (RTS frame)" is replaced with "Data (Data frame)" and "CTS (CTS frame)" is replaced with "ACK (ACK frame)".

Example of Transmission Suppression Invalidating Process

A processing procedure of a transmission suppression invalidating process of the information processing apparatus 100 according to the fourth embodiment of the present technology modifies a portion of the processing procedure illustrated in FIG. 12. Specifically, within the processing procedure illustrated in FIG. 12, "RTS (RTS frame)" is replaced with "Data (Data frame)" and "CTS (CTS frame)" is replaced with "ACK (ACK frame)".

Example of Frame Exchange Process During Reusing of Wireless Resources

FIG. 24 is a flowchart illustrating a frame exchange process during reusing of wireless resources within the processing procedure of the wireless resource reusing process of the information processing apparatus 100 according to the fourth embodiment of the present technology. This processing procedure is a processing procedure performed instead of step S840 illustrated in FIGS. 10 and 14 and modifies a portion of step S840 illustrated in FIG. 14. That is, the respective processes (steps S961 to S963) illustrated in FIG. 24 are the same as the respective processes (steps S841 to S843) illustrated in FIG. 14 except that "RTS (RTS frame)" is replaced with "Data (Data frame)".

When a DATA frame addressed to the subject apparatus has not been received before the end of the wait period (step S962), the transmitter-side process is performed (step S970). The transmitter-side process (step S970) will be described in detail with reference to FIG. 25.

When a DATA frame addressed to the subject apparatus has been received before the end of the wait period (step S962), the receiver-side process is performed (step S964). In the receiver-side process, a normal operation of just returning an Ack frame is performed (step S964).

Example of Transmitter-Side Process

Figure 25:
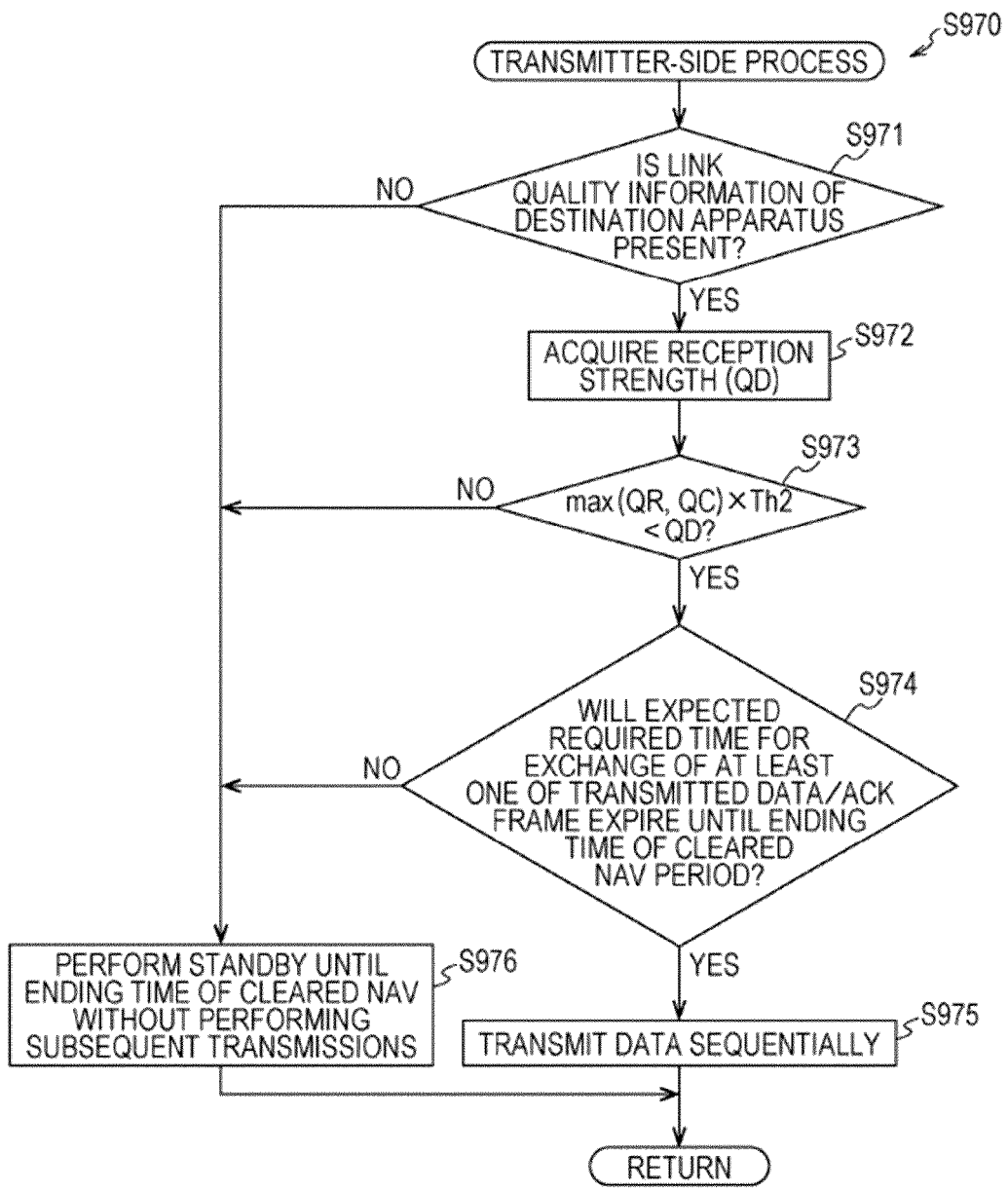
FIG. 25 is a flowchart illustrating a transmitter-side process within the processing procedure of the wireless resource reusing process of the information processing apparatus 100 according to the fourth embodiment of the present technology.

FIG. 25 is a flowchart illustrating a transmitter-side process (a processing procedure of step S970 illustrated in FIG. 24) within the processing procedure of the wireless resource reusing process of the information processing apparatus 100 according to the fourth embodiment of the present technology. This processing procedure modifies a portion of the processing procedure illustrated in FIG. 15. That is, the respective processes (steps S971 to S976) illustrated in FIG. 25 correspond to the respective processes (steps S851 to S856) illustrated in FIG. 15. Due to this, in the following description, differences from the respective processes illustrated in FIG. 15 will be described mainly.

First, the control unit 150 determines whether link quality information on past transmission and reception between the subject apparatus and an information processing apparatus (destination apparatus) corresponding to a transmission destination of data is present in the memory 160 (step S971). When the link quality information of the destination apparatus is present in the memory 160 (step S971), the control unit 150 acquires the link quality information (that is, the reception strength (reception strength (QD) of desired signal) from the connection destination information processing apparatus) (step S972).

Subsequently, the control unit 150 compares the read reception strength (QD) with the measured RTS frame reception strength (QR) and the measured CTS frame reception strength (QC) (step S973). That is, the control unit 150 determines whether Expression 2 described above is satisfied (step S973).

When Expression 2 is satisfied (step S973), the control unit 150 calculates the time necessary for frame exchange necessary for transmission of at least one data frame that is to be transmitted and the Ack frame associated therewith. Moreover, the control unit 150 determines whether the frame exchange will be completed until the estimated ending time of the cleared NAV period (step S974).

When it is determined that the frame exchange will be completed until the estimated ending time of the cleared NAV period (step S974), the control unit 150 proceeds to actual frame exchange and transmits the data frame (step S975).

When it is determined that the frame exchange will not be completed until the estimated ending time of the cleared NAV period (step S974), the control unit 150 performs standby until the NAV clear period without transmitting frames during the NAV clear period (step S976). Moreover, when Expression 2 is not satisfied (step S973), the flow proceeds to step S976.

In this manner, the transmitter side (the information processing apparatus 100) of the wireless resource reusing apparatus transmits the data frame when a predetermined condition is satisfied. That is, the data frame is transmitted only when the reception strength (QD) of the destination apparatus is present, Expression 2 is satisfied, and the time necessary for transmission of at least one data frame that is to be transmitted and the Ack frame associated therewith falls within the cleared NAV period.

The data frame may be retransmitted when it was not possible to receive the ACK frame after transmission of the data frame or when there is time to retransmit the data frame until the ending time of the cleared NAV.

5. Fifth Embodiment

In the fifth embodiment of the present technology, an example corresponding to the second embodiment of the present technology is illustrated. That is, in the fifth embodiment of the present technology, an example in which the same topology and transmission conditions as those of the second embodiment of the present technology are used but the RTS/CTS procedure is not used in the communication between the information processing apparatus 102 and the information processing apparatus 103 is illustrated. In other words, a case where a plurality of EDCA-based frame exchanges is used will be considered and an example in which the information processing apparatus 100 and the information processing apparatus 101 reuse wireless resources is illustrated. It is assumed that the information processing apparatus 100 and the information processing apparatus 101 do not use the RTS/CTS procedure but use a plurality of EDCA-based frame exchanges.

The configuration of the information processing apparatus according to the fifth embodiment of the present technology is approximately the same as that of the information processing apparatuses 100 to 103 illustrated in FIG. 1 and the like. Due to this, the same portions as those of the first embodiment of the present technology will be denoted by the same reference numerals as those of the first embodiment of the present technology, and description of some of these portions will not be provided.

Format Example of Data/Ack Frame

Figure 26A:
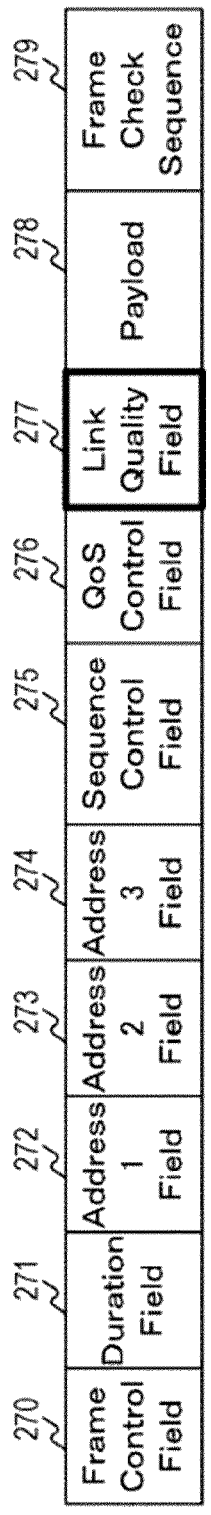
FIGS. 26A to 26C are diagrams illustrating a format example of a Data frame and an Ack frame exchanged between respective information processing apparatuses that form a communication system 10 according to a fifth embodiment of the present technology.
Figure 26B:
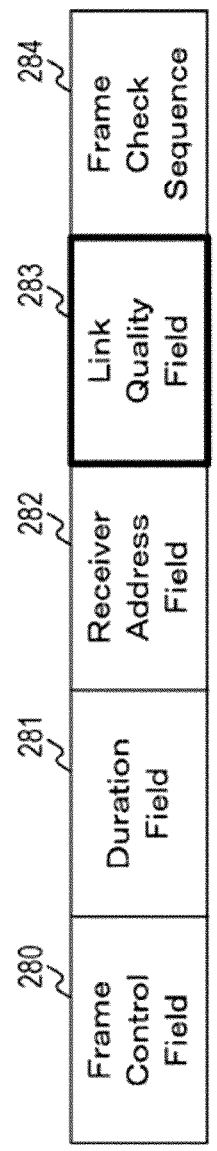
Figure 26C:
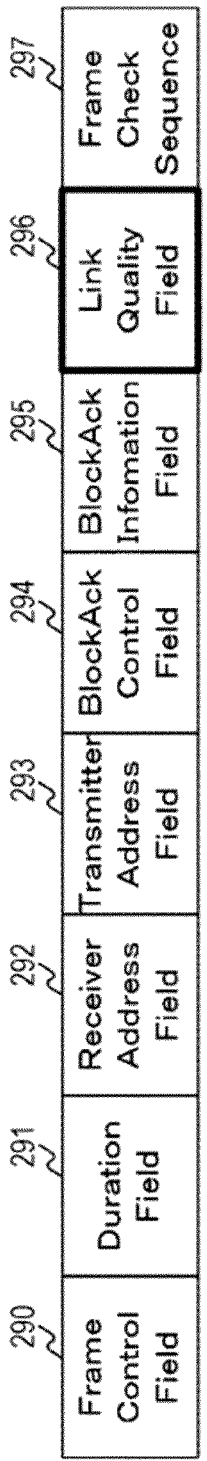

FIGS. 26A to 26C are diagrams illustrating the format example of a data frame and an Ack frame exchanged between the respective information processing apparatuses that form the communication system 10 according to the fifth embodiment of the present technology.

FIG. 26A illustrates the format example of a QoS Data frame, FIG. 26B illustrates the format example of an Ack frame, and FIG. 26C illustrates the format example of a Block Ack frame.

Similarly to the example illustrated in FIGS. 18A and 18B, Link Quality Fields 277, 283, and 296 are added to the data frame and the Ack frame (Block Ack frame). The content of these fields is the same as the example illustrated in FIGS. 18A and 18B. For example, the Link Quality Fields 283 and 296 in the Ack (Block Ack) frame correspond to the Data frame reception strength.

In this manner, FIGS. 26A to 26C illustrate an example in which the Data/Ack frames have different formats from those of general Data/Ack frames.

Example of Wireless Resource Reusing Process

A processing procedure of a wireless resource reusing process of the information processing apparatus 100 according to the fifth embodiment of the present technology modifies a portion of the processing procedure illustrated in FIG. 19. Specifically, within the processing procedure illustrated in FIG. 19, "RTS (RTS frame)" is replaced with "Data (Data frame (or QoS Data frame)". Moreover, "CTS (CTS frame)" is replaced with "Ack (Ack frame) (or Block Ack frame)". Further, steps S873 and S890 are omitted.

Figure 27:
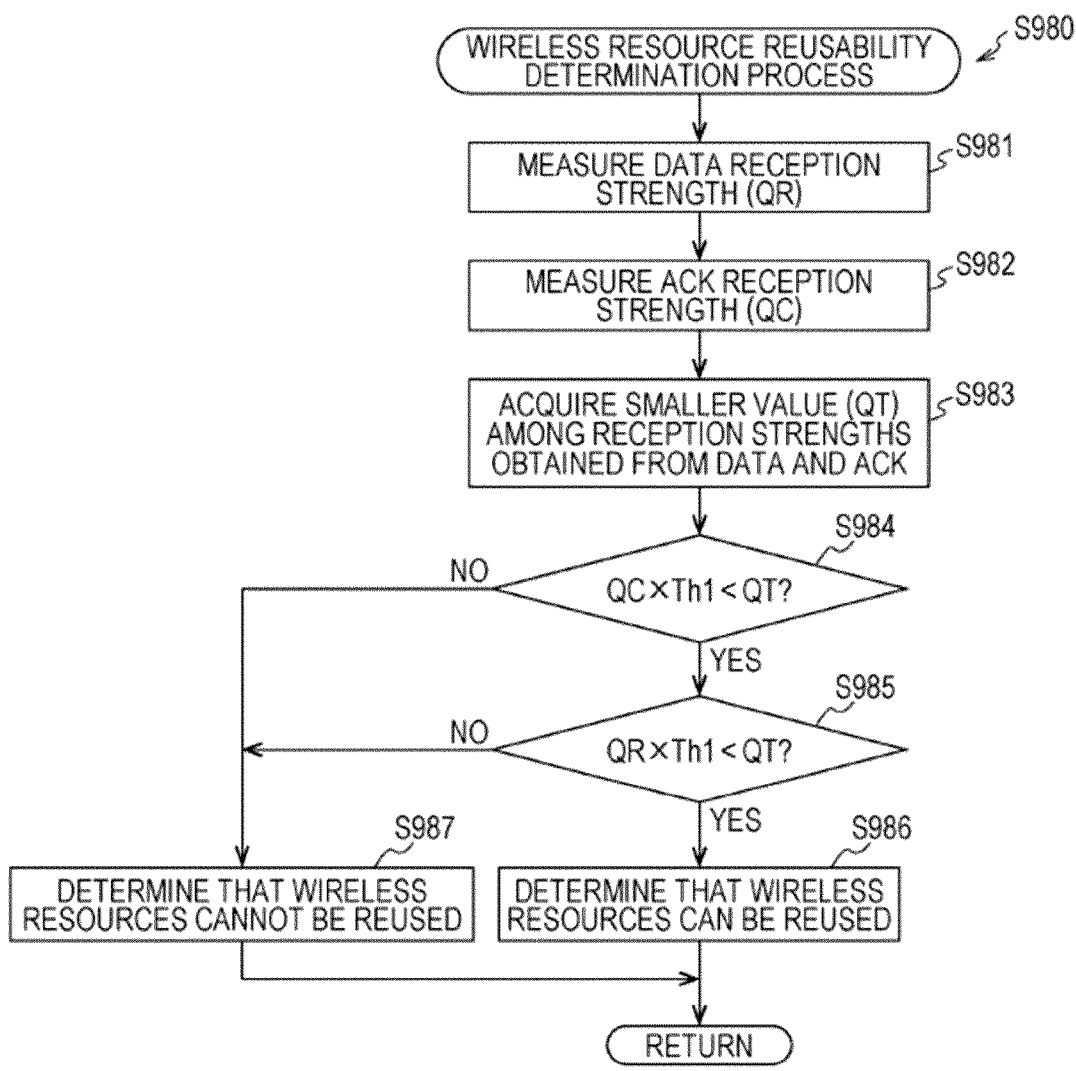
FIG. 27 is a flowchart illustrating a wireless resource reusability determination process within a processing procedure of a wireless resource reusing process of an information processing apparatus 100 according to the fifth embodiment of the present technology.

Moreover, the wireless resource reusability determination process (step S980) illustrated in FIG. 27 is performed instead of the wireless resource reusability determination process (step S880) illustrated in FIG. 19.

Example of Wireless Resource Reusability Determination Process

FIG. 27 is a flowchart illustrating a wireless resource reusability determination process within the processing procedure of the wireless resource reusing process of the information processing apparatus 100 according to the fifth embodiment of the present technology. This processing procedure modifies a portion of the processing procedure illustrated in FIG. 20. That is, the respective processes (steps S981 to S987) illustrated in FIG. 27 correspond to the respective processes (steps S881 to S886 and S888) illustrated in FIG. 20. Specifically, in the respective processes (steps S881 to S886 and S888) illustrated in FIG. 20, "RTS (RTS frame)" is replaced with "Data (Data frame) (or QoS Data frame)". Moreover, "CTS (CTS frame)" is replaced with "Ack (Ack frame) (or Block Ack frame)". Further, the conditional determination is eliminated.

Example of Transmission Suppression Invalidating Process

The processing procedure of the transmission suppression invalidating process of the information processing apparatus 100 according to the fifth embodiment of the present technology is the same as that of the fourth embodiment of the present technology.

Example of Frame Exchange Process During Reusing of Wireless Resources

The processing procedure of the frame exchange process during reusing of wireless resources of the information processing apparatus 100 according to the fifth embodiment of the present technology is the same as that of the fourth embodiment of the present technology.

6. Sixth Embodiment

In the sixth embodiment of the present technology, an example corresponding to the third embodiment of the present technology is illustrated. That is, in the sixth embodiment of the present technology, an example in which the same topology and transmission conditions as those of the third embodiment of the present technology are used but the RTS/CTS procedure is not used in the communication between the information processing apparatus 102 and the information processing apparatus 103 is illustrated. In other words, a case where a plurality of EDCA-based frame exchanges is used will be considered and an example in which the information processing apparatus 100 and the information processing apparatus 101 reuse wireless resources is illustrated. It is assumed that the information processing apparatus 100 and the information processing apparatus 101 do not use the RTS/CTS procedure but use a plurality of EDCA-based frame exchanges.

The configuration of the information processing apparatus according to the sixth embodiment of the present technology is approximately the same as that of the information processing apparatuses 100 to 103 illustrated in FIG. 1 and the like. Due to this, the same portions as those of the first embodiment of the present technology will be denoted by the same reference numerals as those of the first embodiment of the present technology, and description of some of these portions will not be provided.

Example of Wireless Resource Reusability Determination Process

Figure 28:
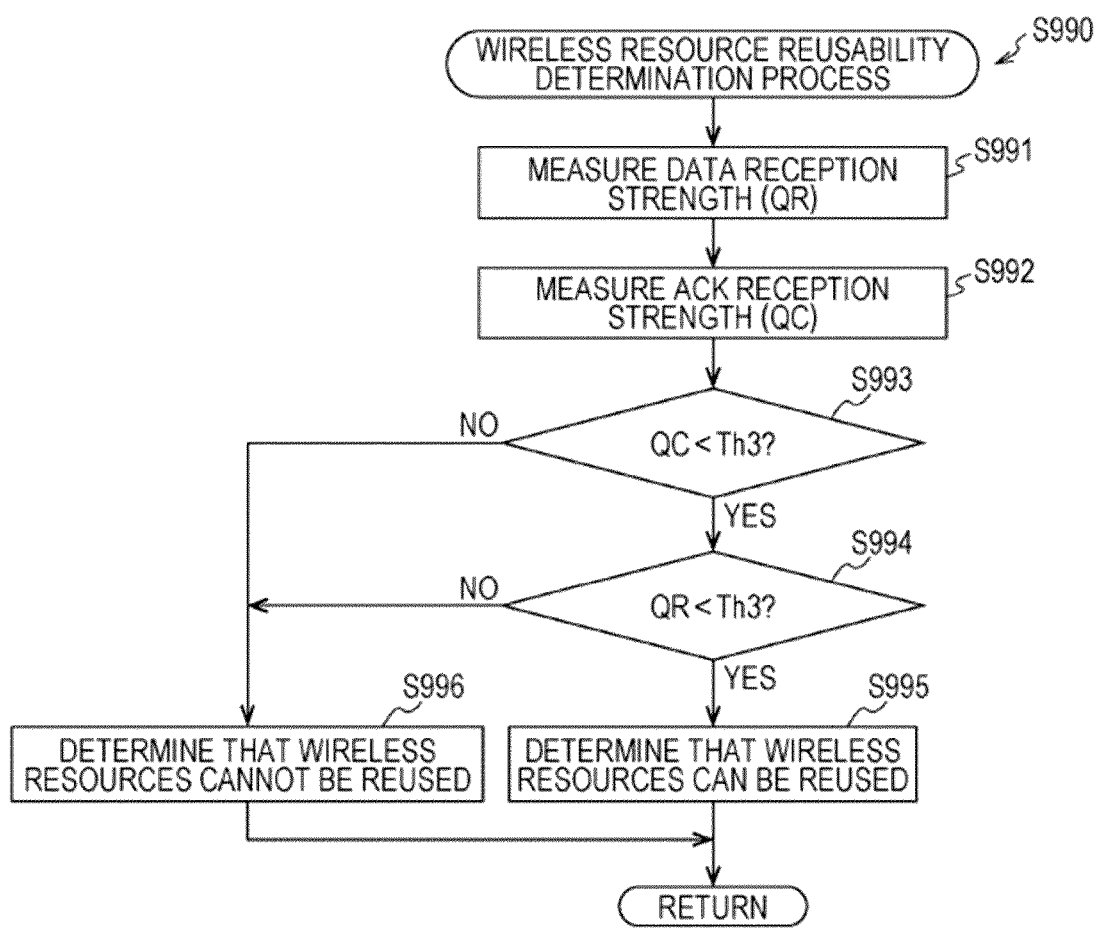
FIG. 28 is a flowchart illustrating a wireless resource reusability determination process within a processing procedure of a wireless resource reusing process of an information processing apparatus 100 according to a sixth embodiment of the present technology.

FIG. 28 is a flowchart illustrating a wireless resource reusability determination process within the processing procedure of the wireless resource reusing process of the information processing apparatus 100 according to the sixth embodiment of the present technology. This processing procedure modifies a portion of the processing procedure illustrated in FIG. 22. That is, the respective processes (steps S991 to S996) illustrated in FIG. 28 correspond to the respective processes (steps S951 to S955 and S957) illustrated in FIG. 22. Specifically, in the respective processes (steps S951 to S955 and S957) illustrated in FIG. 22, "RTS (RTS frame)" is replaced with "Data (Data frame) (or QoS Data frame)". Moreover, "CTS (CTS frame)" is replaced with "Ack (Ack frame) (or Block Ack frame)". Further, the conditional determination is eliminated.

Example of Transmission Suppression Invalidating Process

The processing procedure of the transmission suppression invalidating process of the information processing apparatus 100 according to the sixth embodiment of the present technology is the same as that of the fourth embodiment of the present technology.

Example of Frame Exchange Process During Reusing of Wireless Resources

The processing procedure of the frame exchange process during reusing of wireless resources of the information processing apparatus 100 according to the sixth embodiment of the present technology is the same as that of the fourth embodiment of the present technology.

The fourth to sixth embodiments of the present technology can be applied to a case where "Data" in the fourth to sixth embodiments of the present technology is replaced with "Aggregated MPDU (MAC protocol data unit) obtained by connecting Data". Similarly, the fourth to sixth embodiments of the present technology can be applied to a case where "Ack" in the fourth to sixth embodiments of the present technology is replaced with "Block Ack".

Moreover, as described above, the control unit 150 may store the communication quality in the past communication of a predetermined frame with other information processing apparatuses in a predetermined frame or a frame for responding to the predetermined frame and transmit the communication quality to the other information processing apparatuses.

For example, during transmission of a RTS frame, the communication quality (for example, the reception strength) in the past communication of the RTS frame between the information processing apparatus 100 and the destination information processing apparatus of the transmission target RTS frame may be stored in the transmission target RTS frame. Moreover, for example, during transmission of a CTS frame for the RTS frame, the communication quality (for example, the reception strength) in the past communication of the RTS frame between the information processing apparatus 100 and the destination information processing apparatus of the CTS frame may be stored in the CTS frame.

Moreover, during transmission of a data frame or a management frame, the communication quality in the past communication of the frame between the information processing apparatus 100 and the destination information processing apparatus of the transmission target frame may be stored in the transmission target frame. Further, for example, during transmission of an ACK frame for the data frame or the management frame, the communication quality in the past communication of the frame between the information processing apparatus 100 and the destination information processing apparatus of the ACK frame may be stored in the ACK frame. The management frame may be a beacon frame, a management frame, or the like, for example.

As described above, according to the embodiments of the present technology, it is possible to reuse wireless resources while suppressing side effects of a high physical carrier sense detection threshold as much as possible.

Moreover, wireless resources can be reused even when virtual carrier sense is used together. In this manner, even when virtual carrier sense is used also, it is possible to reuse wireless resources while suppressing the side effects of clearing transmission suppression using the communication quality of a plurality of links. As a result, according to the embodiments of the present technology, it is possible to use wireless resources efficiently while maintaining communication quality.

7. Application Example

The technique related to the present disclosure can be applied to various products. For example, the information processing apparatuses 100 to 103 may be realized as a mobile terminal such as a smartphone, a tablet personal computer (PC), a note PC, a portable game terminal, or a digital camera, a stationary terminal such as a television receiver, a printer, a digital scanner, or a network storage, or an on-vehicle terminal such as a car navigation apparatus. Moreover, the information processing apparatuses 100 to 103 may be realized as a terminal (machine type communication (MTC) terminal) that performs machine to machine (M2M) communication such as a smart meter, a vending machine, a remote monitoring apparatus, or a point of sale (POS) terminal. Further, the information processing apparatuses 100 to 103 may be a wireless communication module (for example, an integrated circuit module formed by one die) mounted on these terminals.

7-1. First Application Example

Figure 29:
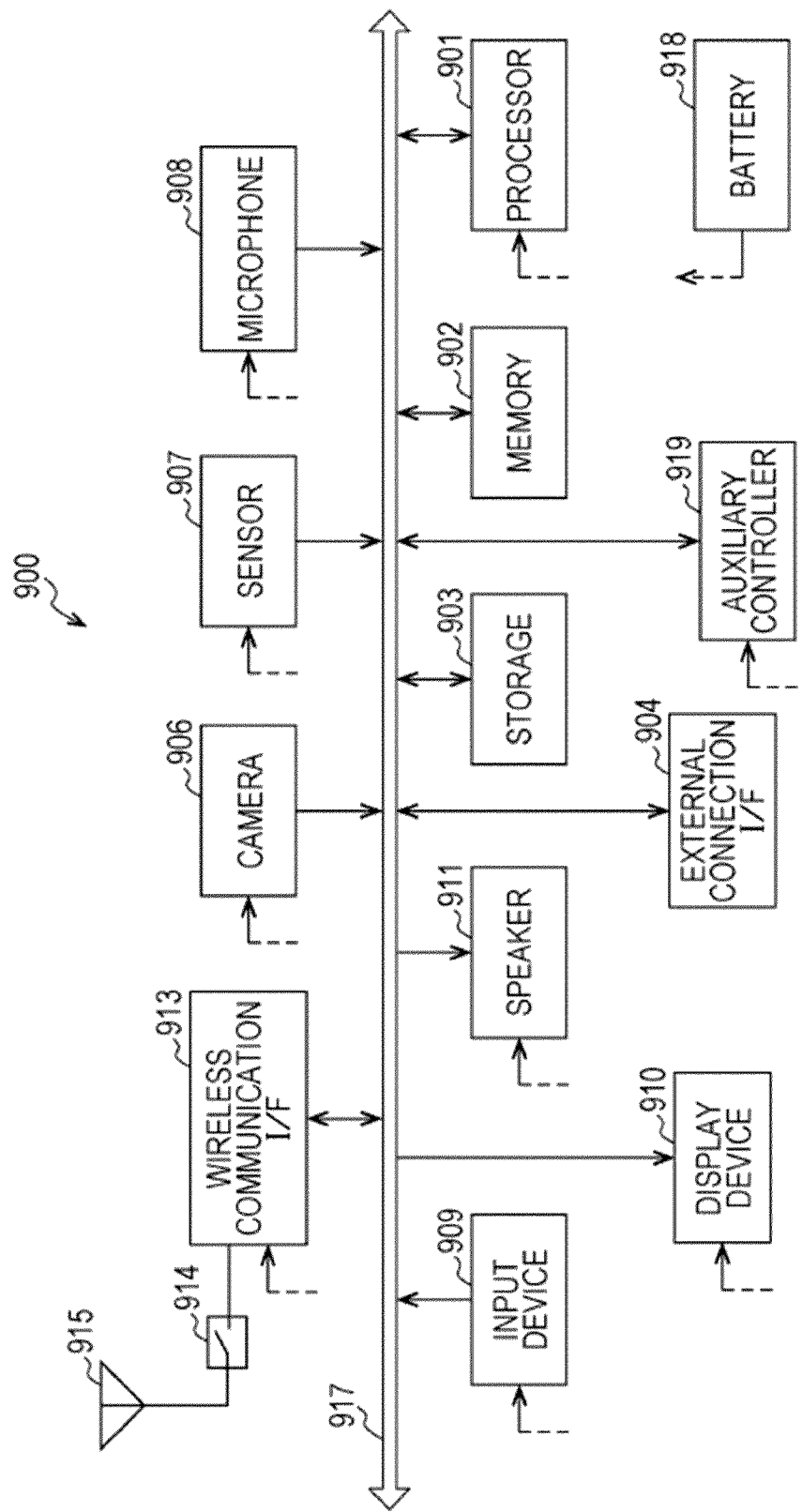
FIG. 29 is a block diagram illustrating an example of a schematic configuration of a smartphone.

FIG. 29 is a block diagram illustrating an example of a schematic configuration of a smartphone 900 to which the technique of the present disclosure is applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be a central processing unit (CPU) or a system on chip (SoC), for example, and controls the functions of an application layer and other layers of the smartphone 900. The memory 902 includes a random access memory (RAM) and a read only memory (ROM) and stores programs and data executed by the processor 901. The storage 903 may include a storage medium such as a semiconductor memory or a hard disk. The external connection interface 904 is an interface for connecting an external device such as a memory card or a universal serial bus (USB) device to the smartphone 900.

The camera 906 includes an imaging device such as a charge coupled device (CCD) or a complementary metal oxide semiconductor (CMOS) and generates images. The sensor 907 may include a sensor group such as a position sensor, a gyro sensor, a geo-magnetic sensor, or an acceleration sensor, for example. The microphone 908 converts sound input to the smartphone 900 to audio signals. The input device 909 includes a touch sensor that detects touches on the screen of the display device 910, a keypad, a keyboard, buttons, or switches, for example, and receives operations or the input of information from users. The display device 910 has a screen of a liquid crystal display (LCD) or an organic light emitting diode (OLED) display and displays an output image of the smartphone 900. The speaker 911 converts the audio signals output from the smartphone 900 to sound.

The wireless communication interface 913 supports at least one of wireless LAN standards such as IEEE 802.11a, 11b, 11g, 11n, 11ac, and 11ad and executes wireless communication. The wireless communication interface 913 can communicate with other apparatuses via a wireless LAN access point in an infrastructure mode. Moreover, the wireless communication interface 913 can communicate directly with other apparatuses in a direct communication mode such as an ad-hoc mode or a Wi-Fi Direct mode. In the Wi-Fi Direct mode, although one of two terminals operates as an access point unlike the ad-hoc mode, communication is performed directly between the two terminals. The wireless communication interface 913 may typically include a baseband processor, a radio frequency (RF) circuit, and a power amplifier. The wireless communication interface 913 may be a memory that stores a communication control program, a processor that executes the program, and a one-chip module in which related circuits are integrated. The wireless communication interface 913 may support other types of wireless communication schemes such as a short-range wireless communication scheme, a proximity wireless communication scheme, or a cellular communication scheme in addition to the wireless LAN scheme. The antenna switch 914 switches the connection destination of the antenna 915 between a plurality of circuits (for example, circuits for other wireless communication schemes) included in the wireless communication interface 913. The antenna 915 includes a single or a plurality of antenna elements (for example, a plurality of antenna elements that forms a MIMO antenna) and is used for allowing the wireless communication interface 913 to transmit and receive wireless signals. Moreover, the antenna 915 has the function of a wireless communication interface for connecting to the public circuit of the IEEE 802.16 or 3GPP specifications (for example, W-CDMA, GSM, WiMAX, WiMAX2, LTE, and LTE-A) and can communicate with the public circuit.

Without being limited to the example of FIG. 29, the smartphone 900 may include a plurality of antennas (for example, a wireless LAN antenna, a proximity wireless communication antenna, and a public circuit communication antenna). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electricity to respective blocks of the smartphone 900 illustrated in FIG. 29 via a power feeding line which is partially depicted by dotted lines in the drawing. The auxiliary controller 919 allows the smartphone 900 to perform operations for the minimum necessary functions in a sleep mode, for example.

In the smartphone 900 illustrated in FIG. 29, the control unit 150 described with reference to FIG. 2 may be mounted on the wireless communication interface 913. Moreover, at least a portion of these functions may be mounted on the processor 901 or the auxiliary controller 919.

The smartphone 900 may operate as a wireless access point (software AP) by the processor 901 executing the access point function in the application level. Moreover, the wireless communication interface 913 may have the function of the wireless access point.

7-2. Second Application Example

Figure 30:
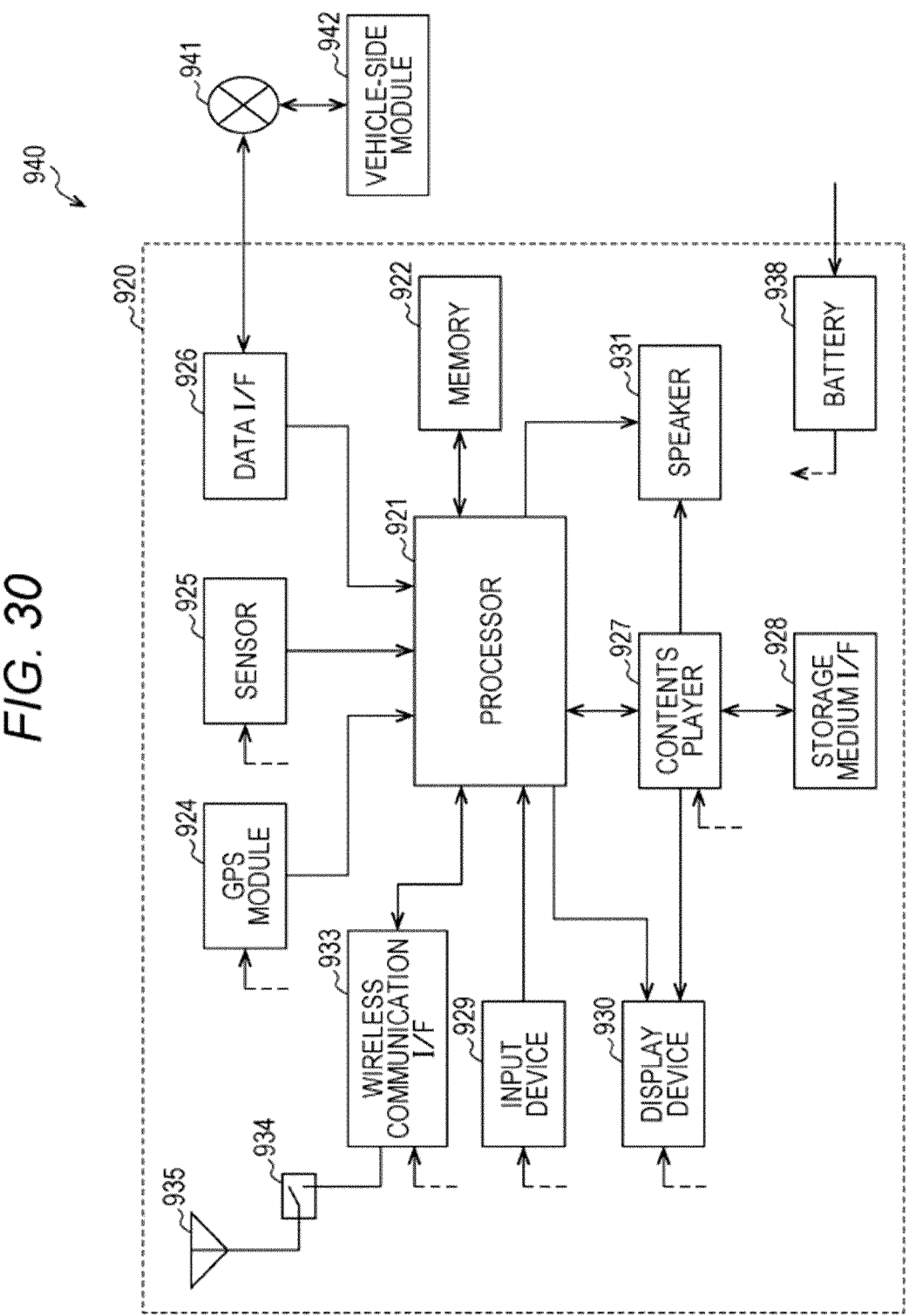
FIG. 30 is a block diagram illustrating an example of a schematic configuration of a car navigation apparatus.

FIG. 30 is a block diagram illustrating an example of a schematic configuration of the car navigation apparatus 920 to which the technique related to the present disclosure is applied. The car navigation apparatus 920 includes a processor 921, a memory 922, a global positioning system (GPS) module 924, a sensor 925, a data interface 926, a contents player 927, a storage medium interface 928, an input device 929, a display device 930, a speaker 931, a wireless communication interface 933, an antenna switch 934, an antenna 935, and a battery 938.

The processor 921 may be a CPU or a SoC, for example, and controls the navigation function and other functions of the car navigation apparatus 920. The memory 922 includes a RAM and a ROM and stores programs and data executed by the processor 921.

The GPS module 924 measures the position (for example, latitude, longitude, and altitude) of the car navigation apparatus 920 using the GPS signals received from GPS satellites. The sensor 925 may include a sensor group such as a gyro sensor, a geo-magnetic sensor, or a pneumatic sensor, for example. The data interface 926 is connected to an on-vehicle network 941 via a terminal (not illustrated), for example, so as to acquire data such as vehicle velocity data generated from the vehicle side.

The contents player 927 plays contents stored in a storage medium (for example, CD or DVD) inserted in the storage medium interface 928. The input device 929 includes a touch sensor that detects touches on the screen of the display device 930, buttons, or switches, for example, and receives operations or the input of information from users. The display device 930 has a screen of a LCD or an OLED display and displays images of the navigation function or the played contents. The speaker 931 outputs the audio of the navigation function or the played contents.

The wireless communication interface 933 supports at least one of wireless LAN standards such as IEEE 802.11a, 11b, 11g, 11n, 11ac, and 11ad and executes wireless communication. The wireless communication interface 933 can communicate with other apparatuses via a wireless LAN access point in an infrastructure mode. Moreover, the wireless communication interface 933 can communicate directly with other apparatuses in a direct communication mode such as an ad-hoc mode or a Wi-Fi Direct mode. The wireless communication interface 933 may typically include a baseband processor, an RF circuit, and a power amplifier. The wireless communication interface 933 may be a memory that stores a communication control program, a processor that executes the program, and a one-chip module in which related circuits are integrated. The wireless communication interface 933 may support other types of wireless communication schemes such as a short-range wireless communication scheme, a proximity wireless communication scheme, or a cellular communication scheme in addition to the wireless LAN scheme. The antenna switch 934 switches the connection destination of the antenna 935 between a plurality of circuits included in the wireless communication interface 933. The antenna 935 includes a single or a plurality of antenna elements and is used for allowing the wireless communication interface 933 to transmit and receive wireless signals.

Without being limited to the example of FIG. 30, the car navigation apparatus 920 may include a plurality of antennas. In this case, the antenna switch 934 may be omitted from the configuration of the car navigation apparatus 920.

The battery 938 supplies electricity to respective blocks of the car navigation apparatus 920 illustrated in FIG. 30 via a power feeding line which is partially depicted by dotted lines in the drawing. The battery 938 stores electricity supplied from the vehicle side.

In the car navigation apparatus 920 illustrated in FIG. 30, the control unit 150 described with reference to FIG. 2 may be mounted on the wireless communication interface 933. Moreover, at least a portion of these functions may be mounted on the processor 921.

Moreover, the technique related to the present disclosure may be realized as an on-vehicle system (or a vehicle) 940 that includes at least one of the blocks of the car navigation apparatus 920, the on-vehicle network 941, and a vehicle-side module 942. The vehicle-side module 942 generates vehicle-side data such as a vehicle speed, an engine rotation speed, or fault information and outputs the generated data to the on-vehicle network 941.

The embodiments described above are shown as an example for implementing the present technology. The matters in the embodiments have corresponding relations to the invention specifying matters in the claims. Similarly, the invention specifying matters in the claims have corresponding relations to the matters in the embodiments of the present technology having the same names as the invention specifying matters. However, the present technology is not limited to the embodiments, and various modifications can be made in the range without departing from the subject matter of the present disclosure.

In addition, the processing procedures described in the embodiments of the present disclosure may be grasped as the methods including the series of procedures. Moreover, the series of procedures may be grasped as the programs for making a computer execute the series of the procedures, or a recording medium storing the programs. As the recording medium, a CD (compact disc), a MD (MiniDisc), a DVD (digital versatile disk), a memory 160 card, a blu-ray disc (registered trademark), and the like may be used.

The advantages described in the present specification are examples only and the present technology is not limited thereto, and other advantages may be provided.

The present technology may have the following configurations.

(1)

An information processing apparatus including: a control unit that performs control of clearing transmission suppression based on communication quality during reception of at least one of a first frame of which the destination is not the information processing apparatus and a second frame transmitted in response to the first frame when the transmission suppression is set in accordance with reception of at least one of the first frame and the second frame.

(2)

The information processing apparatus according to (1), wherein the control unit clears the transmission suppression when the communication quality of the first frame and information on whether the first frame is received and the communication quality of the second frame and information on whether the second frame is received satisfy a predetermined condition.

(3)

The information processing apparatus according to (2), wherein the control unit determines whether the predetermined condition is satisfied based on a result of comparison between the communication quality of at least one of the first frame and the second frame in the information processing apparatus and the communication quality between a source information processing apparatus of the first frame and a destination information processing apparatus of the first frame.

(4)

The information processing apparatus according to (3), wherein the communication quality during past communication between the source information processing apparatus and the destination information processing apparatus is notified, and the control unit determines whether the predetermined condition is satisfied using the notified communication quality.

(5)

The information processing apparatus according to (3), wherein the first frame or the second frame includes the communication quality during past communication between the source information processing apparatus and the destination information processing apparatus, and the control unit determines whether the predetermined condition is satisfied using the communication quality included in the first frame or the second frame.

(6)
The information processing apparatus according to any of (2) to (5), wherein when it was not possible to receive either the first frame or the second frame, the control unit determines whether the predetermined condition is satisfied using communication quality corresponding to a carrier sense detection threshold instead of the communication quality of the first frame or the second frame which was not received.

(7)
The information processing apparatus according to (2) or (6), wherein the control unit determines that the predetermined condition is satisfied when it was possible to receive the first frame or the second frame and the communication quality of the received first frame or second frame is smaller than a threshold.

(8)
The information processing apparatus according to any of (1) to (7), wherein when data that is to be transmitted to another information processing apparatus is present, the control unit starts transmitting the data after the elapse of a standby period defined by a predetermined procedure from clearing of the transmission suppression.

(9)
The information processing apparatus according to any of (1) to (7), wherein when data that is to be transmitted to another information processing apparatus is present, the control unit estimates whether the data to be transmitted to the other information processing apparatus will be received with a predetermined communication quality in the other information processing apparatus and determines whether the data during clearing of the transmission suppression will be transmitted based on the estimation result.

(10)
The information processing apparatus according to (9), wherein the control unit performs the estimation based on a result of comparison between the communication quality during past communication with the other information processing apparatus and a larger one of the communication quality of the first frame and the communication quality of the second frame.

(11)
The information processing apparatus according to any of (1) to (10), wherein when a RTS frame addressed to the information processing apparatus is received during clearing of the transmission suppression, the control unit determines whether a CTS frame will be sent as a response to the RTS frame based on a result of comparison between the communication quality of the RTS frame and a larger one of the communication quality of the first frame and the communication quality of the second frame.

(12)
The information processing apparatus according to any of (1) to (11), wherein the control unit clears the transmission suppression for a predetermined period from the time at which the second frame was received.

(13)
The information processing apparatus according to any of (1) to (12), wherein the control unit performs control of changing a carrier sense detection threshold together with clearing the transmission suppression.

(14)
The information processing apparatus according to (13), wherein the control unit changes the carrier sense detection threshold until an ending time of a transmission suppression period specified by the first frame or the second frame.

(15)
The information processing apparatus according to (13), wherein the control unit changes the carrier sense detection threshold until the time subtracted by the expected time necessary for transmitting an acknowledgement frame from the ending time of the transmission suppression period specified by the first frame or the second frame.

(16)
The information processing apparatus according to any of (13) to (15), wherein the control unit sets such a value that it is not possible to detect a frame having a better communication quality among the communication quality of the first frame and the communication quality of the second frame as the carrier sense detection threshold.

(17)
The information processing apparatus according to any of (13) to (16), wherein the control unit calculates the time necessary for frame exchange of data to be transmitted to another information processing apparatus and performs control so that the data during clearing of the transmission suppression is not to be transmitted when it is not possible to complete reception of an acknowledgement frame for the data within a period of changing the carrier sense detection threshold.

(18)
The information processing apparatus according to any of (1) to (17), wherein the control unit stores communication quality in the past communication with another information processing apparatus in a predetermined frame or a frame for responding to the predetermined frame and performs control of transmitting the communication quality to the other information processing apparatus.

(19)
An information processing apparatus including: a control unit that performs control of changing a carrier sense detection threshold based on communication quality during reception of at least one of a first frame of which the destination is not the information processing apparatus and a second frame transmitted in response to the first frame when the transmission suppression is set in accordance with reception of at least one of the first frame and the second frame.

(20)
An information processing method including: clearing transmission suppression based on communication quality during reception of at least one of a first frame of which the destination is not an information processing apparatus and a second frame transmitted in response to the first frame when the transmission suppression is set in the information processing apparatus in accordance with reception of at least one of the first frame and the second frame.

(21)
An electronic device comprising: circuitry configured to perform control of disabling transmission suppression based on a communication quality of at least one of a first frame of which an intended destination is not the electronic device and a second frame transmitted in response to the first frame in a case that the transmission suppression is initially set.

(22)
The electronic device according to (21), wherein the circuitry is configured to disable the transmission suppression in a case that the communication quality of the first frame and information on whether the first frame is received and the communication quality of the second frame and information on whether the second frame is received satisfy a predetermined condition.

(23)
The electronic device according to (22), wherein the circuitry is configured to determine whether the predetermined condition is satisfied based on a result of comparison between the communication quality of at least one of the first frame and the second frame in the electronic device and the communication quality between a source device of the first frame and a destination device of the first frame.

(24)
The electronic device according to (23), wherein the circuitry is configured to: receive information indicating communication quality during past communication between the source device and the destination device, and determine whether the predetermined condition is satisfied based on the received information.

(25)
The electronic device according to any of (23) to (24), wherein the first frame or the second frame includes information indicating communication quality during past communication between the source device and the destination device, and the circuitry is configured to determine whether the predetermined condition is satisfied based on the information indicating the communication quality included in the first frame or the second frame.

(26)
The electronic device according to any of (22) to (25), wherein in a case that it was not possible to receive either the first frame or the second frame, the circuitry is configured to determine whether the predetermined condition is satisfied based on communication quality corresponding to a carrier sense detection threshold.

(27)
The electronic device according to any of (22) to (26), wherein the circuitry is configured to determine that the predetermined condition is satisfied in a case that it was possible to receive the first frame or the second frame and the communication quality of the received first frame or second frame is smaller than a threshold.

(28)
The electronic device according to any of (21) to (27), wherein in a case that data that is to be transmitted to another device is present, the circuitry is configured to start transmitting the data after elapse of a standby period defined by a predetermined procedure from disabling the transmission suppression.

(29)
The electronic device according to any of (22) to (28), wherein in a case that data to be transmitted to another device is present, the circuitry is configured to estimate whether the data to be transmitted to the other device will be received with a predetermined communication quality in the other device and determine whether the data during disabling the transmission suppression will be transmitted based on a result of the estimation.

(30)
The electronic device according to (29), wherein the circuitry is configured to perform the estimation based on a result of a comparison between the communication quality during past communication with the other device and a larger one of the communication quality of the first frame and the communication quality of the second frame.

(31)
The electronic device according to any of (21) to (30), wherein in a case that a request-to-send (RTS) frame addressed to the electronic device is received during disabling the transmission suppression, the circuitry is configured to determine whether a clear-to-send (CTS) frame will be sent as a response to the RTS frame based on a result of comparison between the communication quality of the RTS frame and a larger one of the communication quality of the first frame and the communication quality of the second frame.

(32)
The electronic device according to any of (21) to (31), wherein the circuitry is configured to disable the transmission suppression for a predetermined period from a time at which the second frame was received.

(33)
The electronic device according to any of (21) to (32), wherein the circuitry is configured to perform control of changing a carrier sense detection threshold together with disabling the transmission suppression.

(34)
The electronic device according to (33), wherein the circuitry is configured to change the carrier sense detection threshold until an ending time of a transmission suppression period specified by the first frame or the second frame is reached.

(35)
The electronic device according to any of (33) to (34), wherein the circuitry is configured to change the carrier sense detection threshold until a time subtracted by an expected time necessary for transmitting an acknowledgement frame from an ending time of the transmission suppression period specified by the first frame or the second frame is reached.

(36)
The electronic device according to any of (33) to (35), wherein the circuitry is configured to set, as the carrier sense detection threshold, a value that it is not possible to detect a frame having a better communication quality among the communication quality of the first frame and the communication quality of the second frame.

(37)
The electronic device according to any of (33) to (36), wherein the circuitry is configured to calculate a time necessary for frame exchange of data to be transmitted to another device and perform control so that data during disabling the transmission suppression is not to be transmitted in a case that it is not possible to complete reception of an acknowledgement frame for the data within a period of changing the carrier sense detection threshold.

(38)
The electronic device according to any of (21) to (37), wherein the circuitry is configured to store communication quality of past communication with another device in a predetermined frame or a frame for responding to the predetermined frame and perform control of transmitting the communication quality to the other device.

(39)
An electronic device comprising: circuitry configured to control changing a carrier sense detection threshold based on a communication quality of at least one of a first frame of which an intended destination is not the electronic device and a second frame transmitted in response to the first frame in a case that the transmission suppression is initially set.

(40)

A method performed by an electronic device, the method comprising: disabling, by circuitry of the electronic device, transmission suppression based on a communication quality of at least one of a first frame of which an intended destination is not the electronic device and a second frame transmitted in response to the first frame in a case that the transmission suppression is initially set.

REFERENCE SIGNS LIST

10 Communication system
100 to 103 Information processing apparatus
110 Data processing unit
120 Transmission processing unit
130 Modulation-demodulation unit
140 Wireless interface unit
141 Antenna
150 Control unit
160 Memory
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Contents player
928 Storage medium interface
929 Input device
930 Display device
931 Speaker
933 Wireless communication interface
934 Antenna switch
935 Antenna
938 Battery
941 On-vehicle network
942 Vehicle-side module

The invention claimed is:

1. An electronic device comprising:
a memory storing link quality information; and
circuitry configured to
determine a communication quality of at least one of a first frame of which an intended destination is not the electronic device and a second frame transmitted in response to the first frame in a case that transmission suppression is initially set;
determine a source address and a destination address of the first frame;
determine whether the link quality information for the source address and the destination address is available;
upon a determination that the link quality information is not available, enable transmission suppression;
upon a determination that the link quality information is available, determine whether the communication quality of said at least one of the first frame and the second frame satisfies a predetermined criterion relating to the link quality information;
upon a determination that the predetermined criterion is met, disable the transmission suppression; and
upon a determination that the predetermined criterion is not met, enable the transmission suppression.

2. The electronic device according to claim 1, wherein the circuitry is configured to disable the transmission suppression in a case that the communication quality of the first frame and information on whether the first frame is received and the communication quality of the second frame and information on whether the second frame is received satisfy the predetermined condition.

3. The electronic device according to claim 2, wherein the circuitry is configured to determine whether the predetermined condition is satisfied based on a result of comparison between the communication quality of at least one of the first frame and the second frame in the electronic device and the communication quality between a source device of the first frame and a destination device of the first frame.

4. The electronic device according to claim 3, wherein the circuitry is configured to:
receive information indicating communication quality during past communication between the source device and the destination device, and
determine whether the predetermined condition is satisfied based on the received information.

5. The electronic device according to claim 3, wherein the first frame or the second frame includes information indicating communication quality during past communication between the source device and the destination device, and
the circuitry is configured to determine whether the predetermined condition is satisfied based on the information indicating the communication quality included in the first frame or the second frame.

6. The electronic device according to claim 2, wherein in a case that it was not possible to receive either the first frame or the second frame, the circuitry is configured to determine whether the predetermined condition is satisfied based on communication quality corresponding to a carrier sense detection threshold.

7. The electronic device according to claim 2, wherein the circuitry is configured to determine that the predetermined condition is satisfied in a case that it was possible to receive the first frame or the second frame and the communication quality of the received first frame or second frame is smaller than a threshold.

8. The electronic device according to claim 1, wherein in a case that data that is to be transmitted to another device is present, the circuitry is configured to start transmitting the data after elapse of a standby period defined by a predetermined procedure from disabling the transmission suppression.

9. The electronic device according to claim 1, wherein in a case that data to be transmitted to another device is present, the circuitry is configured to estimate whether the data to be transmitted to the other device will be received with a predetermined communication quality in the other device and determine whether the data during disabling the transmission suppression will be transmitted based on a result of the estimation.

10. The electronic device according to claim 9, wherein the circuitry is configured to perform the estimation based on a result of a comparison between the communication quality during past communication with the other device and a larger one of the communication quality of the first frame and the communication quality of the second frame.

11. The electronic device according to claim 1, wherein in a case that a request-to-send (RTS) frame addressed to the electronic device is received during disabling the transmission suppression, the circuitry is configured to determine whether a clear-to-send (CTS) frame will be sent as a response to the RTS frame based on a result of comparison between the communication quality of the RTS frame and a larger one of the communication quality of the first frame and the communication quality of the second frame.

12. The electronic device according to claim 1, wherein the circuitry is configured to disable the transmission suppression for a predetermined period from a time at which the second frame was received.

13. The electronic device according to claim 1, wherein the circuitry is configured to perform control of changing a carrier sense detection threshold together with disabling the transmission suppression.

14. The electronic device according to claim 13, wherein the circuitry is configured to change the carrier sense detection threshold until an ending time of a transmission suppression period specified by the first frame or the second frame is reached.

15. The electronic device according to claim 13, wherein the circuitry is configured to change the carrier sense detection threshold until a time subtracted by an expected time necessary for transmitting an acknowledgement frame from an ending time of the transmission suppression period specified by the first frame or the second frame is reached.

16. The electronic device according to claim 13, wherein the circuitry is configured to set, as the carrier sense detection threshold, a value that it is not possible to detect a frame having a better communication quality among the communication quality of the first frame and the communication quality of the second frame.

17. The electronic device according to claim 13, wherein the circuitry is configured to calculate a time necessary for frame exchange of data to be transmitted to another device and perform control so that data during disabling the transmission suppression is not to be transmitted in a case that it is not possible to complete reception of an acknowledgement frame for the data within a period of changing the carrier sense detection threshold.

18. The electronic device according to claim 1, wherein the circuitry is configured to store communication quality of past communication with another device in a predetermined frame or a frame for responding to the predetermined frame and perform control of transmitting the communication quality to the other device.

19. The electronic device according to claim 1, wherein the circuitry is configured to disable the transmission suppression by changing a carrier sense detection threshold based on the communication quality of said at least one of the first frame and the second frame.

20. A method performed by an electronic device, the method comprising:
determining, by circuitry of the electronic device, a communication quality of at least one of a first frame of which an intended destination is not the electronic device and a second frame transmitted in response to the first frame in a case that transmission suppression is initially set;
determining, by the circuitry of the electronic device, a source address and a destination address of the first frame;
determining, by the circuitry of the electronic device, whether link quality information for the source address and the destination address is available;
upon a determination that the link quality information is not available, enabling, by the circuitry of the electronic device, transmission suppression;
upon a determination that the link quality information is available, determining, by the circuitry of the electronic device, whether the communication quality of said at least one of the first frame and the second frame satisfies a predetermined criterion relating to the link quality information;
upon a determination that the predetermined criterion is met, disabling, by the circuitry of the electronic device, the transmission suppression; and
upon a determination that the predetermined criterion is not met, enabling, by the circuitry of the electronic device, the transmission suppression.

* * * * *